United States Patent
Fridgren et al.

(10) Patent No.: US 11,263,303 B1
(45) Date of Patent: Mar. 1, 2022

(54) PATTERN-BASED MOBILE DEVICE UNLOCKING

(71) Applicant: Google LLC, Mountain View, CA (US)

(72) Inventors: Per Ake Daniel Fridgren, Malmo (SE); Tobias Arrehn, Malmo (SE); Simon M. Thorsander, Eslov (SE); Erick Tseng, San Francisco, CA (US)

(73) Assignee: Google LLC, Mountain View, CA (US)

(*) Notice: Subject to any disclaimer, the term of this patent is extended or adjusted under 35 U.S.C. 154(b) by 557 days.

(21) Appl. No.: 16/000,126

(22) Filed: Jun. 5, 2018

Related U.S. Application Data

(63) Continuation of application No. 14/525,738, filed on Oct. 28, 2014, now Pat. No. 10,013,546, which is a continuation of application No. 12/058,116, filed on Mar. 28, 2008, now Pat. No. 8,904,479.

(51) Int. Cl.
*H04L 29/06* (2006.01)
*G06F 21/36* (2013.01)

(52) U.S. Cl.
CPC .................................. *G06F 21/36* (2013.01)

(58) Field of Classification Search
CPC ........... G06T 17/00; G06F 3/00; G06F 21/36; G06Q 20/3274
See application file for complete search history.

(56) References Cited

U.S. PATENT DOCUMENTS

| | | | |
|---|---|---|---|
| 4,315,944 A | 2/1982 | Ramacci | |
| 5,559,961 A | 9/1996 | Blonder | |
| 6,983,061 B2 | 1/2006 | Ikegami et al. | |
| 7,219,368 B2 | 5/2007 | Juels et al. | |
| 7,322,524 B2 | 1/2008 | Silverbrook et al. | |
| 7,480,870 B2 | 1/2009 | Anzures et al. | |
| 8,036,433 B1 | 10/2011 | Wolf | |
| 8,564,544 B2 * | 10/2013 | Jobs | G06F 3/0488 345/173 |
| 2004/0034801 A1 | 2/2004 | Jaeger | |
| 2005/0154935 A1 * | 7/2005 | Jin | G06F 21/31 713/324 |
| 2005/0253817 A1 | 11/2005 | Rytivaara et al. | |
| 2006/0175339 A1 | 8/2006 | Gelardi et al. | |
| 2007/0150842 A1 * | 6/2007 | Chaudhri | H04M 1/67 715/863 |
| 2008/0220752 A1 * | 9/2008 | Forstall | H04M 1/56 455/415 |

OTHER PUBLICATIONS

Abdalla et al., "Provably Secure Password-based Authentication in TLS", posted at the eScholarship Repository, University of California, Copyright 2005 (13 pages).

(Continued)

*Primary Examiner* — Joseph P Hirl
*Assistant Examiner* — Leynna Truvan
(74) *Attorney, Agent, or Firm* — Shumaker & Sieffert, P.A.

(57) ABSTRACT

A computer-implemented method of authenticating a user with a computing device is disclosed. The method involves displaying a grid of selectable visually-distinguishable graphical elements on a device display, receiving from a user of the device a drawn pattern across the selectable graphical elements, comparing the received drawn pattern to information representing a stored authentication pattern for the user, and unlocking access to functions on the device if the received drawn pattern substantially matches the stored authentication pattern.

14 Claims, 20 Drawing Sheets

(56) References Cited

OTHER PUBLICATIONS

Tao, "Pass-Go, a New Graphical Password Scheme", theses as submitted to the Faculty of Graduate and Postdoctoral Studies for Electrical and Computer Engineering, University of Ottawa, Jun. 2006 (110 pages).

Jermyn et al., "The Design and Analysis of Graphical Passwords", for Proceedings of the 8$^{th}$ USENIX Security Symposium, Aug. 23-26, 1999 (15 pages).

Suo et al., "Graphical Passwords: A Survey", 21st Annual Computer Security Applications Conference, Dec. 5-9, 2005 (10 pages).

Office Action issued in U.S. Appl. No. 12/058,116 dated Dec. 19, 2011, 18 pages.

Office Action issued in U.S. Appl. No. 12/058,116 dated Sep. 4, 2012, 32 pages.

Office Action issued in U.S. Appl. No. 12/058,116 dated Jun. 21, 2013, 30 pages.

Office Action issued in U.S. Appl. No. 12/058,116 dated Mar. 7, 2014, 26 pages.

Notice of Allowance issued in U.S. Appl. No. 12/058,116 dated Oct. 1, 2014, 7 pages.

Office Action issued in U.S. Appl. No. 14/525,738, dated Mar. 18, 2016, 19 pages.

Office Action issued in U.S. Appl. No. 14/525,738, dated Nov. 17, 2016, 19 pages.

Office Action issued in U.S. Appl. No. 14/525,738, dated Jun. 15, 2017, 16 pages.

Office Action issued in U.S. Appl. No. 14/525,738, dated Dec. 28, 2017, 26 pages.

Notice of Allowance issued in U.S. Appl. No. 14/525,738, dated Apr. 10, 2018, 9 pages.

Duncan et al., "Visual Security for Wireless Handheld Devices", The Journal of Science & Health at the university of Alabama, 2, May 2004, 9 pages.

Jansen, "Authenticating Mobile Device Users Through Image Selection," WIT Transactions on Information and Communication Technologies, 30, Apr. 7, 2004, 10 pages.

\* cited by examiner

PATTERN-BASED MOBILE DEVICE UNLOCKING

CROSS-REFERENCE TO RELATED APPLICATIONS

This application is a continuation of U.S. patent application Ser. No. 14/525,738, filed Oct. 28, 2014, which is a continuation of and claims priority to U.S. patent application Ser. No. 12/058,116 (now issued U.S. Pat. No. 8,904,479), filed Mar. 28, 2008 The disclosures of both of these identified applications is expressly incorporated herein by reference in its entirety.

TECHNICAL FIELD

This document relates to systems and techniques for generating graphical display elements and controls.

BACKGROUND

More and more, personal computing devices are moving from the desktop to the palmtop. As mobile devices such as smart phones gain more computing power and graphical capabilities, while shrinking in size, people can perform, on the go, many of the tasks that used to be reserved for the office. As a result, more and more data is available to users through their mobile devices. Such data may also become available to others who acquire the mobile devices, such as thieves or other ne'er-do-wells.

Access to a device by such bad actors may be blocked by requiring that a password be entered to access the device when it is first powered up. In addition, when a device has been left untouched for a predetermined time period, it may also go into a locked-down, sleep mode, from which a password is required in order to enter information. Also, certain limited functionality may be provided without the entry of a password, such as the display of contact information for the true owner of the device, and access to emergency (e.g., 911) dialing on the device.

SUMMARY

This document describes systems and techniques that may be used to lock or unlock a mobile device so as to restrict access to certain of the device's functions to an authorized user. The access may be restricted by requiring a user seeking access to draw a pattern on a display of the device, such as by drawing with their finger or a stylus across elements on a touch screen display in a connect-the-dots fashion. The pattern may be a pattern that was previously recorded by the user as a form of personalized password. If the pattern drawn by the user matches a saved pattern, the device may be unlocked for use by the user.

Certain particular features may be provided with such an implementation. For example, the speed with which a user traces the pattern may be tracked both at the time of setting the pattern and at the time of entering the pattern to gain access to the device. Such speed may be checked over a portion of the pattern (so that the user may integrate into his or her pass code a tracing that runs fast in some areas and slow in others), or over the pattern as a whole (e.g., so that only the time from the beginning of the tracing to the end is compared). In addition, the user may be able to trace back across part of the pattern, and to "double back" if they would like.

Other such non-typed pass code input techniques can be used. For example, a user may trace out a pattern in the air with their device, and an accelerometer in the device may track the motions to match them against prior motions. In such a situation, the precision required to make a match may be loosened on the device since it will be harder for a user to repeat motions in free-form space. Also, an accelerometer in the device may sense taps on the device and match the tempo or rhythm of the taps to stored values. As such, a user's pass code may be the opening tempo of the William Tell Overture, and the user may tap the code in with his or her fingers when the device is sitting on a tabletop.

Such an input pattern may also be used as an identification badge that is presented to the user. By presenting the badge to a user, a central system can identify itself as an organization that is properly associated with the user, and is not a fraudulent organization pretending to be the legitimate organization (e.g., the user's bank). The badge can also be used as a passcode for qualifying the user, e.g., by presenting a large number of badges to the user and making them select the one that is their traced passcode. Such an approach may be helpful where the user initially enters a passcode for a system when they are on their touch screen device, and they later wish to log into their account from a non-touch screen device. A traced passcode may also be mixed with a textual password, so that the user may enter the former if they cannot type, and can enter the latter if they cannot draw. To provide additional options for a badge, and thus additional security, the badge may be animated, i.e., shown with the elements in a grid being lit up in the order they were initially traced by the user.

In certain implementations, such systems and technique may provide one or more advantages. For example, a user may more readily remember certain drawn inputs where they might forget a traditional typed password. Also, the tracing may be conducted using a single finger on one hand, which may provide more flexibility for a user on the run than does a requirement to type in a password. Moreover, traced inputs may be personalized to a user's particular style, especially when the speed of the input is used as part of the authentication process, much like a person stylizes their signature and can repeat it without thinking.

In one implementation, a computer-implemented method of authenticating a user with a computing device is disclosed. The method comprises displaying a grid of selectable visually-distinguishable graphical elements on a device display, receiving from a user of the device a drawn pattern across the selectable graphical elements, comparing the received drawn pattern to information representing a stored authentication pattern for the user, and unlocking access to functions on the device if the received drawn pattern substantially matches the stored authentication pattern. Comparing the received drawn pattern to information representing a stored authentication pattern can comprises generating an ordered list of graphical elements traversed by the tracing and comparing the ordered list to a stored ordered list. The method can also comprise monitoring the speed of the drawn pattern and comparing information indicative of the speed with information indicative of a speed for the authentication pattern.

In some aspects, the information indicative of the speed comprises a time to track a full pass code. Also, the information indicative of the speed can comprise a multiple times that each correspond to a time to trace part of a pass code, and wherein each of the multiple times are compared to a time corresponding to a time for part of the authentication pattern. In addition, the selectable visually-distinguishable graphical elements can comprise spatially separated dots in an m×n grid, wherein m may equal or not equal n. In certain aspects, the method can comprise changing the appearance of the selectable visually-distinguishable graphical elements as a user selects each element while tracing. The grid of selectable visually-distinguishable graphical elements can also not be displayed until the user has begun drawing a pattern.

The method can additionally include determining a prior state of the computing device and making the device available to a user in that state upon unlocking access to functions on the device. The method can also comprise unlocking access to features of the device for contacting public emergency services even if a pattern that substantially matches the authentication pattern is not received, and unlocking access to substantially all device features if a pattern that substantially matches the authentication pattern is received.

In other aspects, the drawn pattern passes each of a plurality of the selectable visually-distinguishable graphical elements more than once. The method can also include receiving from a user of the device a traced pattern and storing corresponding information as the authentication pattern. In addition, the method can comprise presenting a graphical representation of the drawn pattern to a user as a badge to identify a service provider to the user as being a legitimate service provider, and also subsequently presenting a graphical representation of the drawn pattern to a user along with a large plurality of other patterns and verifying the user if the user selects the drawn pattern. The method can also comprise determining whether the user is using a device having touch input before presenting the graphical representation of the drawn pattern along with the other patterns.

In another implementation, a tangible article comprising a computer-readable data storage medium storing program code operable to cause one or more machines to perform operations is disclosed. The operations comprise displaying a grid of selectable visually-distinguishable graphical elements on a device display, receiving from a user of the device a drawn pattern across the selectable graphical elements, comparing the received drawn pattern to information representing a stored authentication pattern for the user, and unlocking access to functions on the device if the received drawn pattern substantially matches the stored authentication pattern. The operations can further comprise monitoring the speed of the drawn pattern and comparing information indicative of the speed with information indicative of a speed for the authentication pattern. In addition, the operations can comprise changing the appearance of the selectable visually-distinguishable graphical elements as a user selects each element while tracing. The operations may also include determining a prior state of the computing device and making the device available to a user in that state upon unlocking access to functions on the device.

In certain aspects, the operations comprise unlocking access to features of the device for contacting public emergency services even if a pattern that substantially matches the authentication pattern is not received, and unlocking access to substantially all device features if a pattern that substantially matches the authentication pattern is received. The drawn pattern can pass each of a plurality of the selectable visually-distinguishable graphical elements more than once, and the operations can further comprise subsequently presenting a graphical representation of the drawn pattern to a user along with a large plurality of other patterns and verifying the user if the user selects the drawn pattern.

In yet another implementation, a computer-implemented user interface system is disclosed, and comprises a graphical user interface module to display a grid of selectable visually-distinguishable graphical elements on a device display, a touch screen to receive user-drawn patterns across the grid of selectable visually-distinguishable graphical elements, and an access manager programmed to compare information from the received drawn pattern to information from a stored authentication pattern for the user, and unlock access to functions on the device if the comparison indicates a match. The access manager can be programmed to identify the speed of the drawn pattern and compare information indicative of the speed with information indicative of a speed for the authentication pattern.

In certain aspects, the graphical user interface module can be controlled to change the appearance of the selectable visually-distinguishable graphical elements as a user selects each element while tracing. Also the access manager can be programmed to unlock access to features of the device for contacting public emergency services even if a pattern that substantially matches the authentication pattern is not received, and to unlock access to substantially all device features if a pattern that substantially matches the authentication pattern is received.

In another implementation, a computer-implemented user interface system is disclosed. The system comprises a graphical user interface module to display a grid of selectable visually-distinguishable graphical elements on a device display, a touch screen to receive user-drawn patterns across the grid of selectable visually-distinguishable graphical elements, and means for providing user access to the device in response to the user-drawn patterns.

And in another implementation, a computer-implemented method of authenticating a user with a computing device includes providing, for display to a user, data representing a badge previously drawn by the user on a computing device, receiving a confirmation from the user that the badge is associated with the user, displaying a drawing area to the user and receiving from the user a pattern drawn on a touch screen interface device, comparing the received drawn pattern to information representing a stored authentication pattern for the user, and unlocking access to functions for the user if the received drawn pattern substantially matches the stored authentication pattern.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which mobile devices may interact with a user of such devices. For example, users may provide input for unlocking a mobile device by tracing a pattern through a grid of graphical elements that are distinct from each other (i.e., physically different and visually distinguishable) so as to match a connect-the-dots pattern that has been stored on the device. The time to complete the overall tracing and/or the time to complete certain portions of the tracing may also be used to provide greater security so that it would not be enough for an interloper simply to copy a pattern. As a result, the owner of the device could create a secure pass code even with a simple pattern, simply by varying the speed with which he or she traces the pattern. Various limited functionality can be provided where the user fails to provide the proper pass code.

Figure 1A:
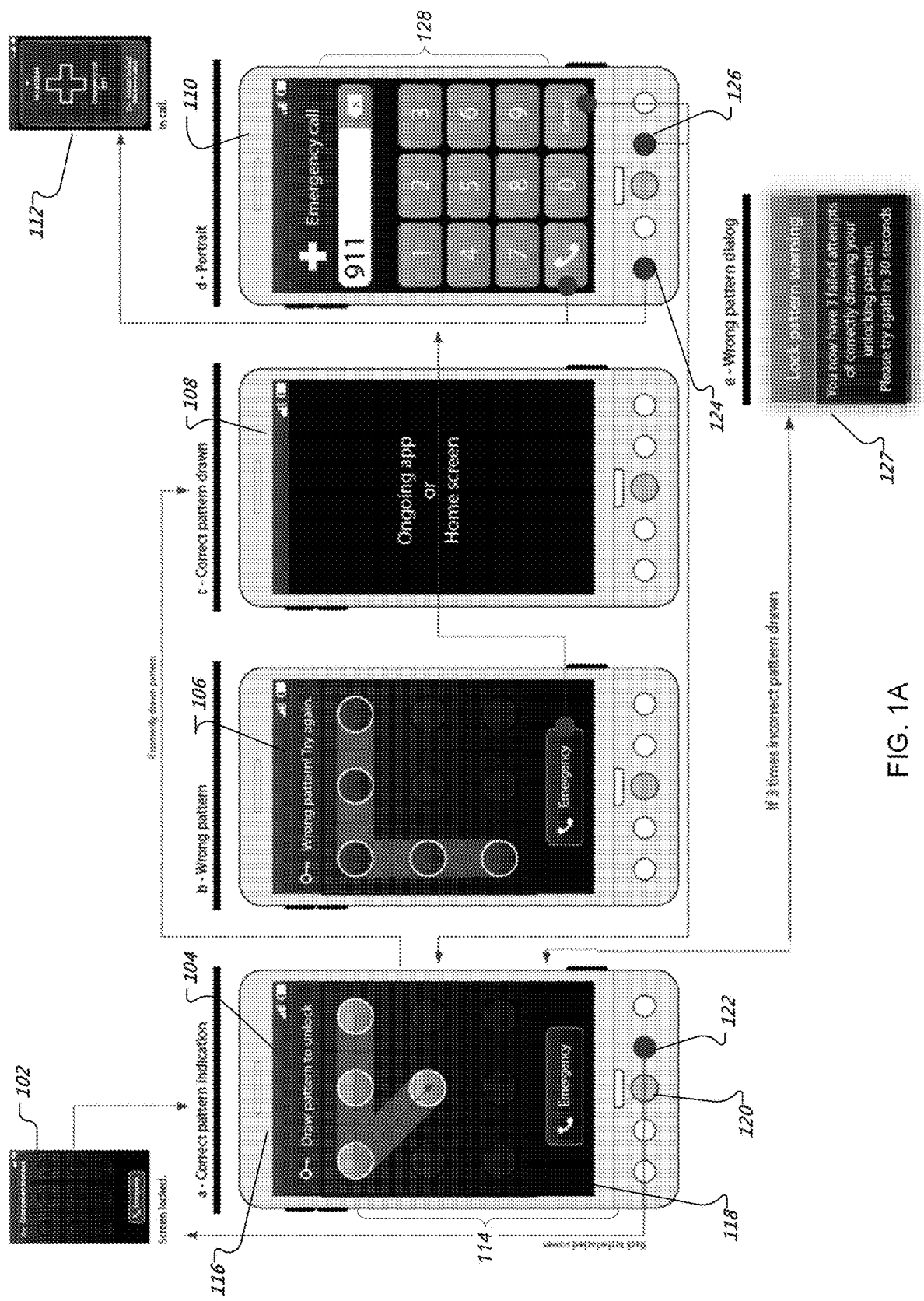
FIG. 1A shows several displays of a locked mobile device being unlocked by a traced pattern.

FIG. 1A shows several displays of a locked mobile device being unlocked by a traced pattern. In general, the displays here show interactions the user may have through a touch screen on a mobile device in order to unlock the device from a locked state. Such interactions may involve tracing a pattern across a grid of dots or similar graphical elements on the device in a manner that matches a unique pattern previously entered or chosen by the user. In referring to the pattern as "unique," it is meant to indicate that the pattern serves as a pass code that is not easily guessed by someone other than the person who chose it or traced it originally. It is not intended to indicate that the pattern must be different from every other pattern that may be used on any other mobile device.

Display 102 provides an example of how a screen on the device may look when it is locked from use by a user. Such a display may be produced, for example, when the device is first turned on or otherwise activated, after a user has explicitly placed the device into a sleep or other similar mode, or after the user has failed to provide input to the device for a predetermined period.

Shown on the display is a 3×3 grid of gray dots, much like a tick-tack-toe board. (The dots may be only moderately visible if they are displayed as dark gray circles or similar elements on a black background.) Also shown are instructions, repeated on display 104, to "draw pattern to unlock," along with a key, to indicate that drawing a pattern will serve to unlock the mobile device for input. In other words, the user of the device is invited to draw a pattern across the dots in the grid, typically with their fingertip or fingertips, to unlock the device. In addition, a selectable control in the form of a button labeled "emergency" may be selected by the user to provide limited functionality from the mobile device, typically in the form of telephone functionality that may dial only a limited number of telephone numbers, such as 911.

In display 104, the user has begun to draw a pattern on the display to unlock the display, as shown by a shadow line across the top three dots in the grid and down to the middle dot in the grid. When the user begins drawing such a pattern, the particular dots that their finger crosses may be activated, such as in a green color to indicate that they are proceeding correctly. As soon as the user has drawn a complete unlocking pattern, such as a pattern that matches an earlier entered pattern when setting up the device, the device may become unlocked. The dots may also be activated in the same manner whether the user is tracing the right pattern or not, so as not to tip off the user until they lift their finger or otherwise indicate they are done.

The actual elements in the grid may remain hidden until after a user has started drawing, and moving in a particular direction. The actual grid shown may depend on the direction the user chooses. For example, if the person begins drawing left to right, the grid may be displayed as a 3×3 grid, whereas if the person begins drawing top-to-bottom, the grid may be a 4×4 grid. As a result, a dishonest interloper will not be able even to know the grid in which they are to be tracing, thus making hacking of the pass code harder. At the same time, however, if the grid is shown right after the user starts drawing, they will be given an immediate guide to where the particular elements in "their" grid are. Thus, the benefit of showing the proper owner the grid as a guide to drawing can be provided even when hiding the grid from improper users is achieved.

If the user draws an incorrect pattern, an error message, such as that shown in display 106, may be generated alerting the user that the pattern was not appropriate. In this example, the user traced a pattern across the top of the grid and down the left side of the grid. The error message may be generated immediately upon the user leaving the appropriate path with their tracing, or for more security, may be generated only after the user has lifted their finger from the display.

A hardware button 122 is programmed in this example to set the device back into a locked state, and in this example, to reset the pattern drawing activity so that a user can try again if they would like. In addition, a trackball 120 may be provided and the user may employ the trackball 120 to move a cursor across the grid of dots in order to trace a pattern.

The pattern drawn by a user may take a variety of forms across each of the dots, which are discrete elements in a grid generated and shown to the user to help guide the user introducing the pattern. In this manner, the dots or similar elements, such as square dots or complete squares that touch each other, may serve to assist the user along their tracing path. In one example, the tracing may take a single path across the device, such as the path shown in display 104 and 106, or may take a Z-shaped path. Alternatively, a path may overlap with itself, such as where a user traces across the outer perimeter of the grid two or more times. Paths may also double back on themselves in certain situations such as when a user traces across the top three dots in the grid and then back up the middle dot before proceeding downward, so as to create a shape like the letter "T."

Multiple paths may also be created where a user lifts their finger and jumps to an element in the grid that is distant from the element on which they were previously pressing. For example, a user may trace down the right side of the grid, with their finger, and then trace down the opposite side of the grid. In such a situation, an entry by the user would not be considered complete simply because the user lifted his or her finger.

Also, the speed at which a path is drawn by a user may be measured. Such measurement may occur at a macro level by measuring the total elapsed time to draw the path, or at a more micro level, by measuring the time to draw certain segments of the path. For example, a user may decide to have a fairly simple and easy to guess shape, such as the letter Z. However, the user may make their code harder to guess by tracing the horizontal lines of the letter very quickly and the diagonal line very slowly. In such an implementation, the device may be programmed to identify substantial changes in speed in the tracing of the path and to classify the speed at certain segments.

The classification of speed may take a variety of forms. For example, the elements in a path may be initially identified by an ordered list of elements in the grid that are selected in the path. For example, the path represented in display 104 may be indicated by the ordered list 0, 2; 0, 1; 0, 0; 1, 1. The speed for tracing the path may be indicated, for example, by adding a total elapsed time to the end of the ordered list, or by adding to each element in the list an elapsed time at which data element was pressed. In determining whether a later-traced pattern matches a code that the user previously entered, the speed may be approximated, such as to create a match if the later entered pattern is within 30, 40, or 50% of the speed for the earlier-entered pattern. In addition, the speed may be classified as fast medium or slow, and matches may be made if the two tracings (the original tracing setting the pass code, and the later tracing trying to unlock the device) match for patterns and for such speed classifications.

Referring again to display 106, when an improper pattern has been entered when the user's finger leaves the display, the user may be notified in a variety of ways that the pattern was wrong. In one example, the elements that appear in the form of dots here may be a first color, such as green, while they are being traced, and may change to a second color, such as red, if the user lifts their finger and the pattern is not a match.

If the pattern is correctly drawn and matches an earlier selected or entered pattern, display 108 may be shown to the user, which is largely blank in this illustration, but represents whatever ongoing application was previously active on the device. Alternatively, a background with selectable application icons may be shown when a proper pass code is traced.

If, during the tracing of a pattern or at another time when the device is locked, the user needs to employ emergency services on the device, such as 911 dialing, the user may select control 118 to have display 110 generated on the device. Display 110 may include a dialing control 128 that may take a form similar to that provided for normal dialing with a telephony function on the device, but with certain features disabled, such as dialing by using a contact list and the like. In this example, an emergency call has been dialed by the 911 number, and the user is given the option of completing the call by pressing hardware key 124. When the selection to complete the call is made, display 112 may be shown to indicate to the user that the call is being completed and also indicate the total elapsed time of the call. In addition, a soft button in the form of a cancel button and a hardware button 126 in the form of a back button may take the user back to the locked state yet again.

Finally, if the putative user attempts to draw a pattern a predetermined number of times, such as three times, and fails, display 127 may be provided on the device, such as to notify the putative user that no more entries will be permitted for a certain period of time. Alternatively, the display may simply lock up and go black, and requite interaction by a different mode such as by dialing a number of the device and entering in a secret code. In this manner, for example, corporate IT staffs can re-enable devices that have been accidentally locked by employees.

Figure 1B:
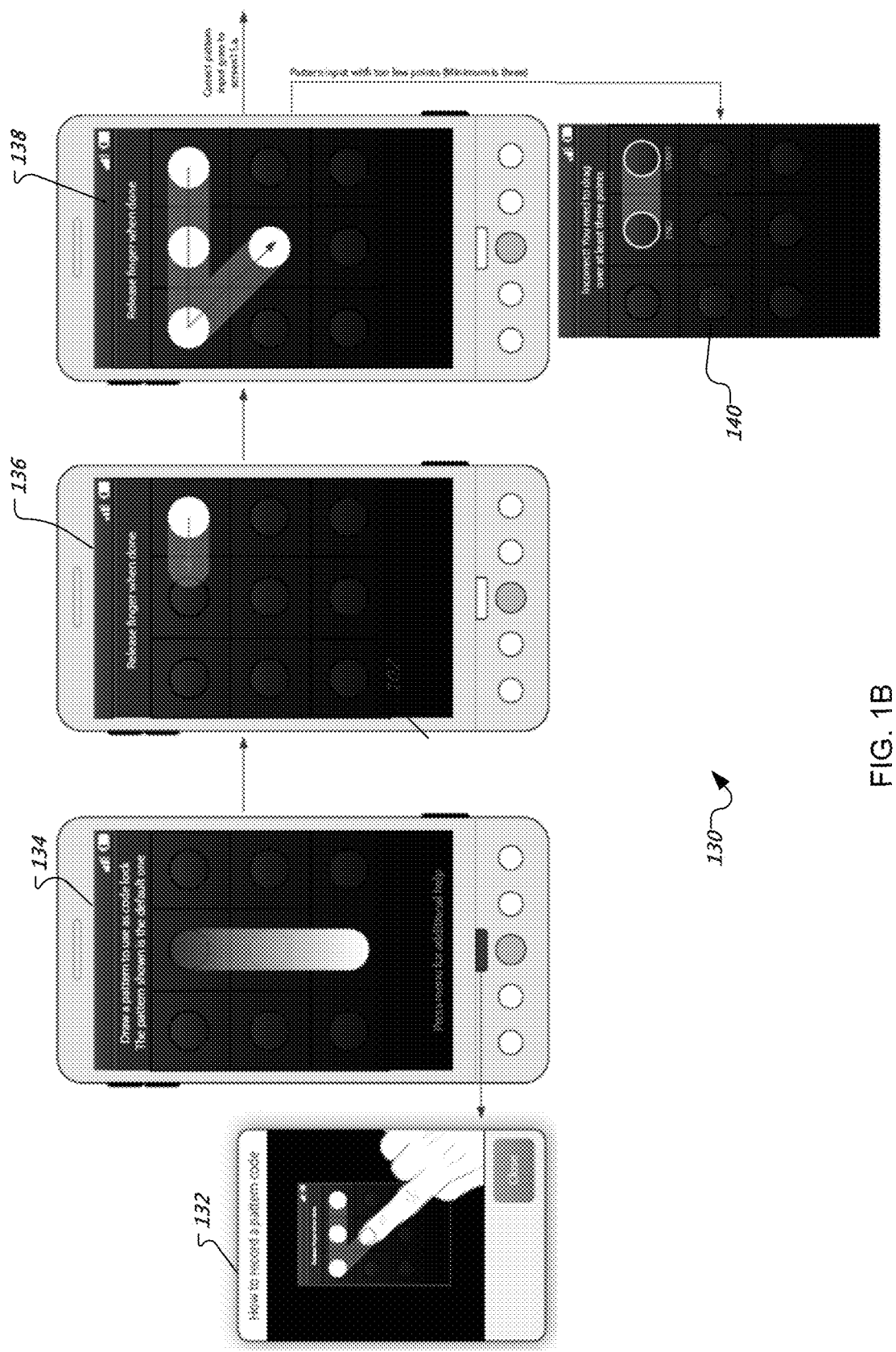
FIGS. 1B-1C show displays of another device for receiving user inputs of unlocking codes.
Figure 1C:
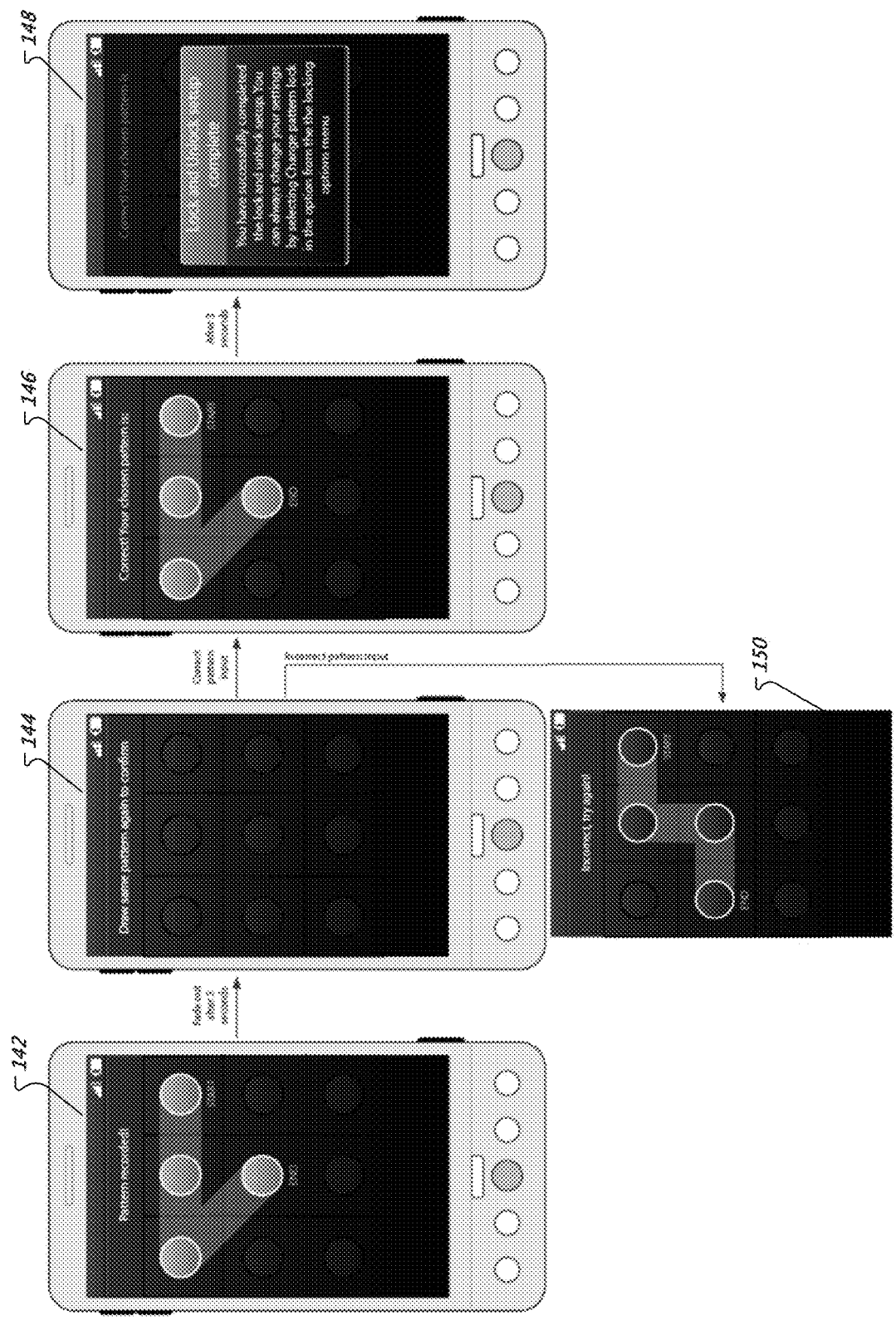

FIGS. 1B-1C show displays of another device for receiving user inputs of unlocking codes. FIG. 1B generally shows the first several displays, while FIG. 1C shows the follow-up screens. The particular screens shown here are provided as an example for clarity, and other approaches may also be employed.

Display 134 shows an initial input screen with instructions that may be provided to a user of a mobile device after they have selected an entry to provide a pass code for their device. The display 134 shows a grid of elements, here a series of circles in a 3×3 tic-tac-toe pattern, along with an example of a dragging action across the grid. In addition a short instruction sentence indicates to the user that they are to drag their finger in a pattern on the display. The user may select a menu button on the device to be showing display 132, which is a help screen. Display 132 may show one or more still images or an animation of a finger tracing a pattern on the device to indicate the manner in which the user is to provide their pass code to the device. The particular pass code shown on the display 132 may be automatically rejected if the user attempts to trace that is their own password, so as to prevent the adoption of easily pickable pass codes in the system.

Display 136 shows action simulating dragging of the user's finger across the screen starting in the top right corner and moving left. The instruction has now changed to a statement that indicates that the user is to release or lift their finger when they are done tracing their code. In display 138, the user has now traced across four different elements in the beginning of the pattern. The user may now with their finger or may continue dragging to complete their pattern Safeguards may be implemented to ensure that a pattern selected by a user is adequately secure. As shown in display 140, an error message may be displayed if the user does not trace across enough elements to provide for a sufficiently secure password—in this case, more than two separate elements. A difficulty score may also be generated for a pattern and may be displayed to the user after they have traced the pattern or while they are tracing the pattern, so that the user may choose to trace a different pattern if their score is too low. Also a pattern may be rejected by the system if the score indicates that the pattern is not sufficiently secure.

Referring now to FIG. 1C, display 142 shows the screen after an appropriate pattern has been recorded by the user. The pattern may be shown exactly as in display 142, with traced dots being lit up, and a shadowed path being drawn between the selected dots. In addition, direction arrows (not shown) may be added to show the direction in which the tracing occurred. This allows the user to see, review, and memorize the pattern that they have traced.

After a set period of time, such as three seconds, the traced patterns may fade out, and the instruction may change to request that the user repeat the pattern, much like requiring repetition of passwords, to ensure that the entered pass code is the pass code that the user actually intended and can provide a later time. At display 150, the user is shown to have entered a pattern that looks like a Tetris playing piece rather than the beginning of a backward letter Z, and the instruction area indicates an error by the user. Alternatively, at display 146 the device indicates that the user properly repeated the pattern that they previously entered. Of course, the whole pattern would only be displayed after the user has traced out the pattern with their finger, so as not to provide the user with the answer before they have entered it. Finally, at display 148, the device indicates to the user that the setup and assignment of a pass code has been successful and that their selected pattern can be used to unlock the device, or that the user may go back and selected another pattern.

Figure 1D:
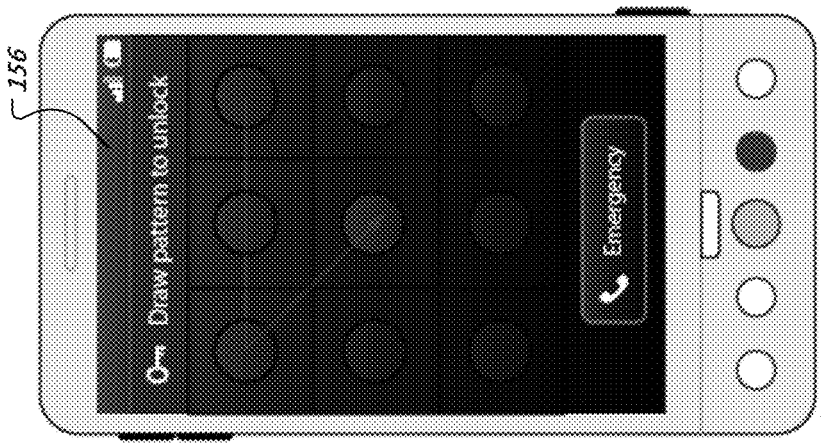
FIG. 1D shows displays relating to setting of interaction parameters for traced unlockings.
Figure 1D:
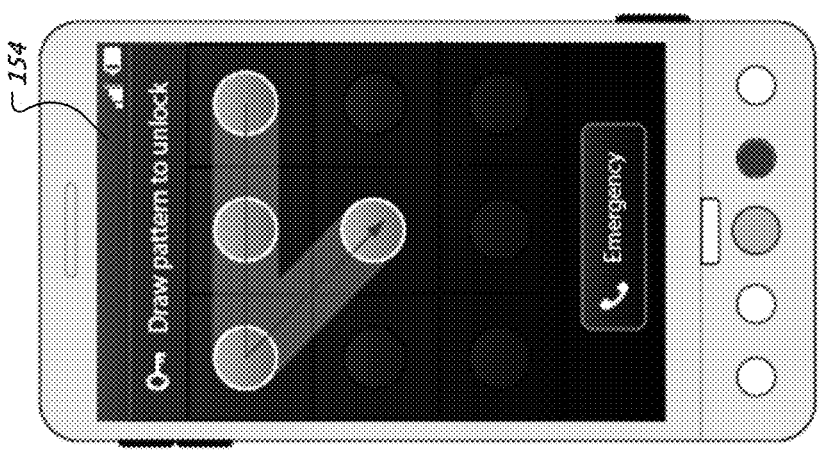
Figure 1D:
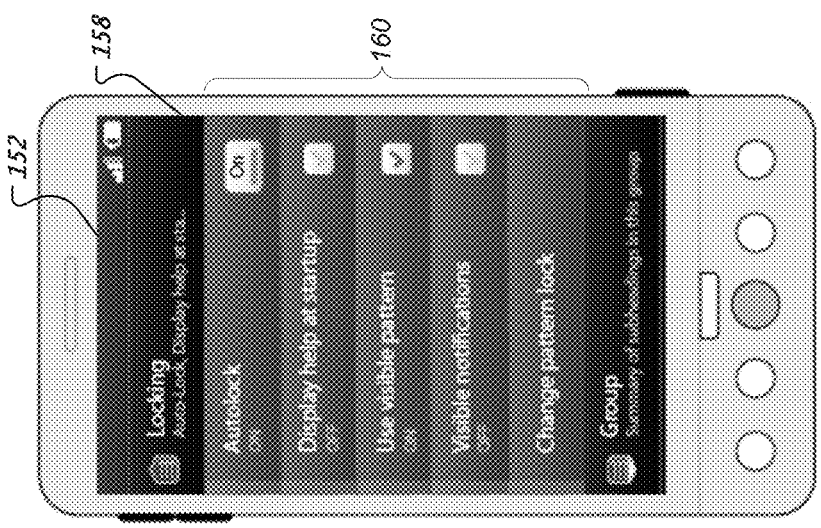

FIG. 1D shows displays in the form of menus for reaching a pattern assignment screen like that shown in FIG. 1C. Display 152 includes a number of elements in a list that may be expanded and contracted such as element 158. In this example, the list is a list of setup options for a mobile device, where two of the elements—a locking element 158 and a group element—are shown on the display 152. The locking element 158 has been expanded to show a list 160 of options available under that element. The options include the ability of a user to turn auto locking of the device on or off, so that the device locks (or does not lock) after a period of inactivity. The list 160 also allows the user to indicate whether they would like to display a help menu or other service when the device is started, or would prefer simply to trace the pattern immediately, and also whether they would like to see visible notifications for the pattern that they are tracing. Finally, the list allows the user to select to change the pattern that will lock or unlock their device.

Display 154 shows an example of the device where the user has selected to see a visible pattern as a trace, whereas display 156 is an example in which the user has selected not to see the pattern. The particular arrows shown on display 154 and display 156 are provided for clarity to indicate the path drawn by the user, and would not typically be shown on the display itself.

Figure 1E:
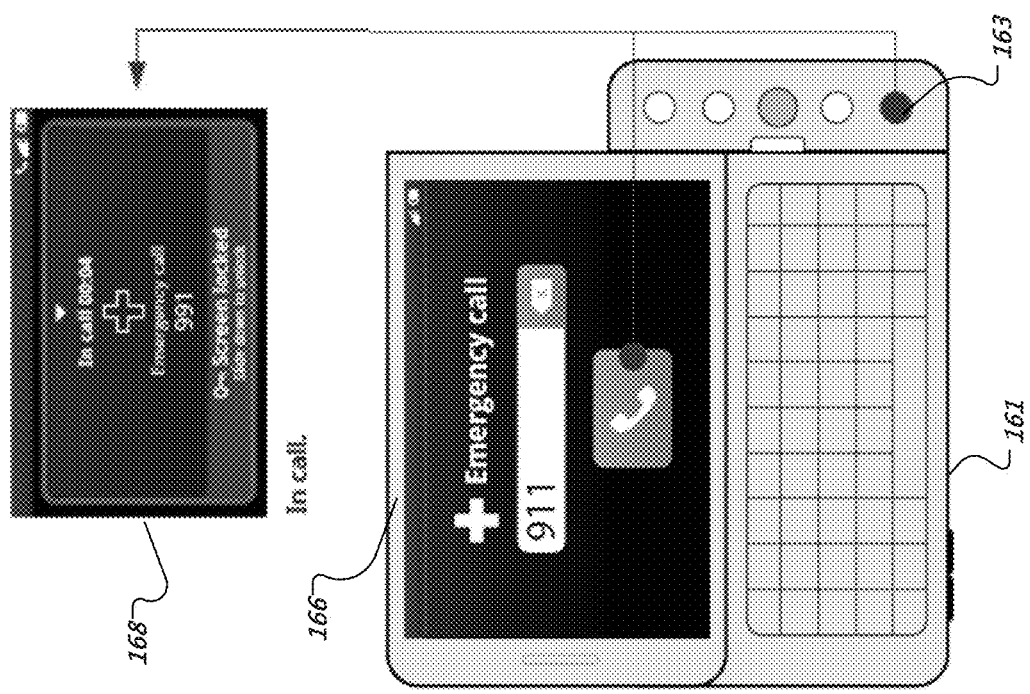
FIG. 1E shows displays for unlocking in a landscape format.
Figure 1E:
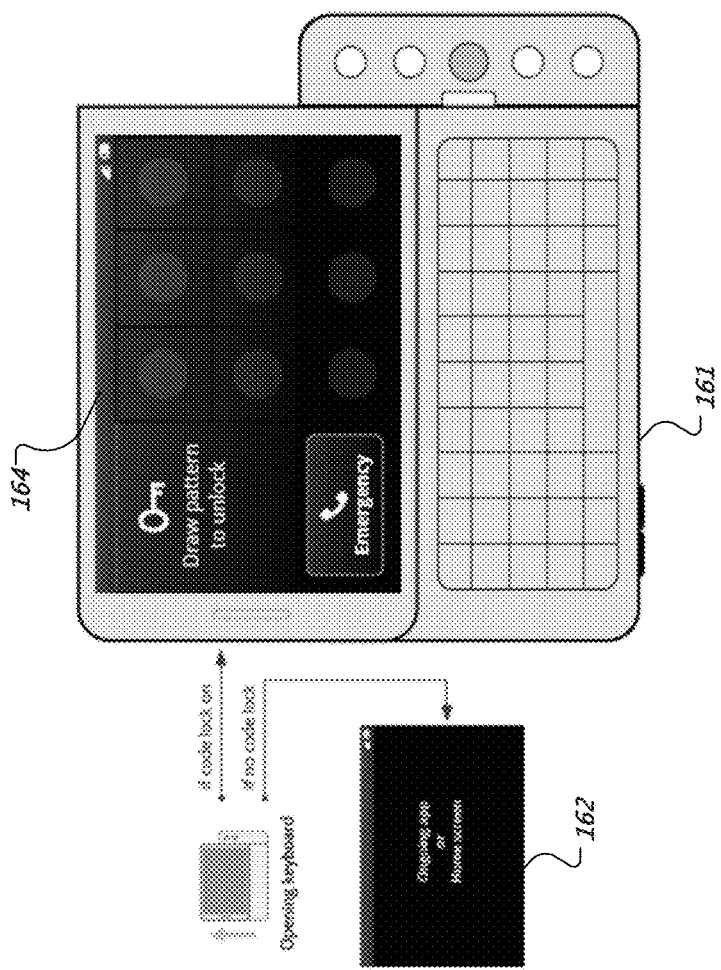

FIG. 1E shows displays for unlocking in a landscape format. In general, the particular features shown here correspond to those showing in FIG. 1A, but with the various graphical elements rearranged to better match a landscape display of a screen.

The particular displays shown here may be initiated when a user slides open a screen on a slider-phone mobile device 161, so as to uncover the device's keyboard. Such an action may be taken by the device 161, reasonably, to indicate that the user wishes to provide input to the device 161. If the device does not have its code lock set, then the application that was displayed before the device 161 went into sleep mode may be displayed again, in a typical manner, at display 162. If the code lock is on, display 164 may be shown, and the user may trace a pass code pattern onto the display 164.

If the user instead selects the "emergency" control on display 164, the display 166 may be shown, which is pre-filled with the 911 emergency call number. The user may then select the telephone icon of hardware button 163 so as to begin the call, and to thereby cause the generation of display 168 that provides the user with visual tracking of the call progress.

Figure 1F:
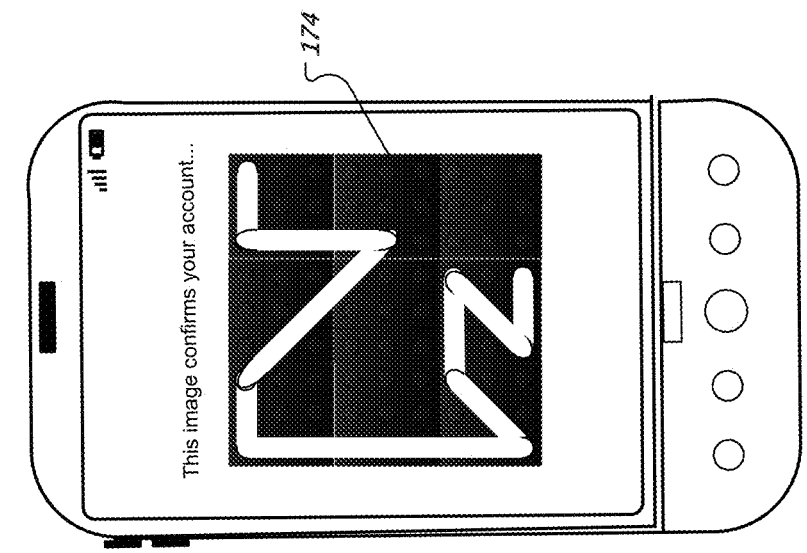
FIG. 1F shows displays of traced patterns used as identification badges on a mobile device.
Figure 1F:
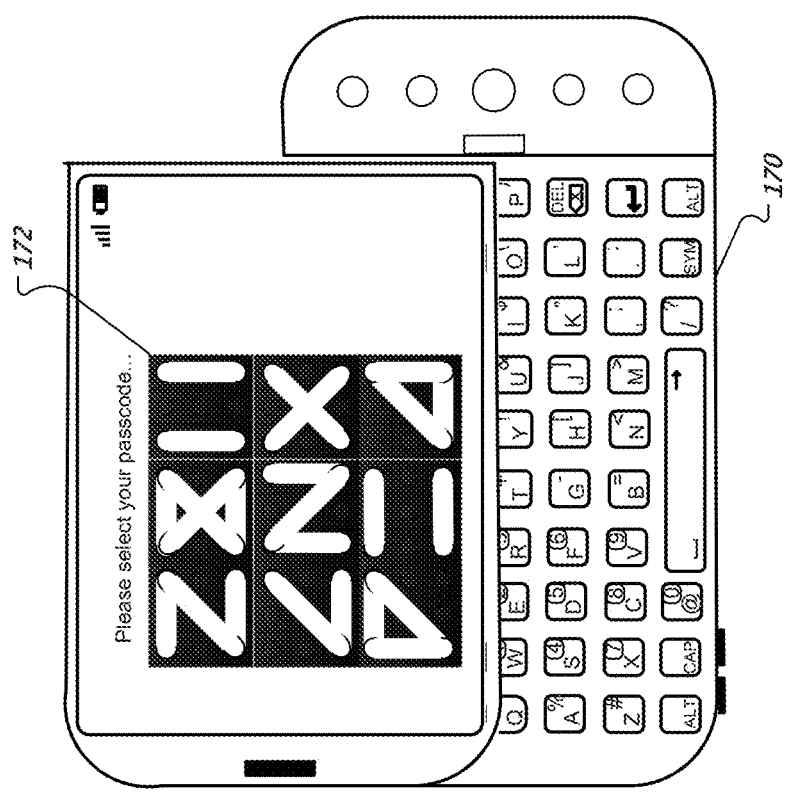

FIG. 1F shows displays of traced patterns used as identification badges on a mobile device. In particular, after a user traces a pattern, that pattern may then be presented to the user at later points in time for various purposes, and may become a badge for the user until they change their traced passcode. For example, device 170 is displaying nine different traced patterns 172 to a user. One of the patterns is a pattern that the user has previously entered into a device such as device 170, and had associated with the device and/or their account at a central server that is remote from the device 170.

Displaying the patterns has a two-fold purpose. First, if the user's actual passcode is one of the patterns among those being displayed, the user can have some confidence that the application or web site displaying the patterns 172 is legitimate, and not a spoof or a phishing attempt. Second, if the user selects the appropriate pattern from among the patterns 172, the application or web page can treat that selection like an entry of a password. In short, verification can be achieved in both directions.

In this example, only nine simple patterns are shown for clarity, so that an improper user might guess the proper passcode, but in an actual implementation, a much larger number of traced patterns may be used as badges. In addition, each of the nine traced patterns may be rendered in a particular color, where the color and the pattern must match in order for the badge to be a match. Such double matching requirement may also provide additional security.

Also, the badges may be animated so as to show the pattern in the order that it was originally drawn (i.e., line a line slowly growing across each grid). By animating the same pattern in different directions, a system may make it harder yet for an interloper to break into a device or account. The animations need not be stored as literal animation files, but instead may be created on the fly from data indicating the order in which the graphical elements were traversed by the user when the user selected his or her passcode initially.

The second device shows a single pattern across a 9×9 grid. In this example, the pattern is being used only as a badge, e.g., from the user's bank to verify the identity of the bank before the user is asked to provide any private information. The larger size of the grid does not make this a better example of a badge necessarily, but would normally provide additional security if the user were asked to enter it as a passcode. Thus, for example, the user may have a common passcode pattern for accessing their device and for accessing their on line accounts. The user may initially set the passcode when they get the device, and may have that passcode passed to their on line account, or may enter the passcode again to set up their on line account. Then, when they later go to a web site of their on line service provider, they may be shown a display such as that showing pattern 174, so that they know it is truly their provider. If they need to access the provider, the passcode may be provided automatically by the device to the provider, to give a form of single sign in for the device and the account. Access to the passcode on the device may be adequately protected by an operating system for the device that integrates passcode handling, along with synchronization with a passcode for an information provider.

The mode of access may vary depending on the device the user is using. For example, if the user is accessing a system from a device that has a touch screen, then the user may be asked to trace their pattern onto a blank grid of elements—a very secure method. If, instead, the user's current device has no touch screen, they may be presented with a large number of badges and may be asked to select their badge.

Also, the badges that are shown with the user's badge may be selected, or generated in real time, to be sufficiently similar to the user's badge so that the real badge does not stand out. For example, where the badge is traced, other "decoy" badges may be selected to have levels of complexity that are similar to that of the real badge.

In a first example, a passcode and badging technique may be employed by a web site operated by a server system that is remote from the device. A user may initially register with the system, such as when they become part of an on-line community. They may be presented a blank space or a grid, and may draw a freeform figure, or trace a path through the grid, respectively. Such input may be registered by the remote server system and may become a passcode and/or badge for the user. When the user later contacts the system by particular mechanisms, such as by selecting a link in an e-mail notification from the web site, the user may be presented with the badge in one of the ways discussed herein, so that the user can be confident that they were truly contacted by the appropriate web site, and not by an organization trying to phish for data. A different pattern may be used as a log on passcode that the user is subsequently require to enter if they want to enter the system. They may draw that passcode if they have a touch screen or tablet input mechanism, may use arrows keys or the like if they do not, or pass enter a traditional alphanumeric password as an alternative.

In a second example, the passcode and badging may be employed by a mobile device itself. For example, a user may initially turn on their device or touch the screen of a device that is in sleep mode, to show an intent to unlock and use the device. The device would display the user's badge to verify that the legitimate operating system was in control and not a spoofing program, and that it is really the appropriate user's device. The operating system would then present a space or grid into which a user could draw or trace a pattern, where the prior display of the badge would help indicate that the grid is legitimate, and not a phishing mechanism. The user may then trace or draw their pattern, which would generally differ from that in the badge, and can then be granted access to the device.

In a third example, the passcode and badging may be employed by a combination of a mobile device and a remote server system. For example, a user may initially purchase a device associated with an on line service provider. As part of the set-up process for the device, the user may trace a passcode with which they are later to be associated. They may also trace a passcode that is to serve as their badge. The set-up process may then transmit such information to the on line service provider, where it can be stored for future using in verifying the on line service provider with the user, and with verifying the user with the on line service provider. When the user later logs onto their device, they may be presented with the badge and may present their passcode. When they subsequently try to access a service from the on line service provider, the device may automatically submit the passcode by a secure agreed-upon protocol. If no such passcode is provided (e.g., because the user is trying to access the service from a different device), the on line service provider may display a grid and/or area in which the user may enter their passcode to be verified by the service provider.

The badge in these situations can be drawn as a freeform design, particularly when it is simply presented visually of the user for verification. In such a situation, the design need not be repeated by the user, where verification of whether the design has been repeated properly can be much more complex for a free form design than for a tracing in a grid or other arrangement of visually distinct elements that are pre-displayed to the user for tracing though.

Using such badging techniques, a user can upload a badge without the need to identify a particular image file or the like. Such a feature may be particularly useful on mobile devices, where the user may not have immediate access to many image files that they could otherwise use as a badge. Also, because the badge looks like many other tracings, it can provide more security than could a photograph in certain situations, because the photograph might "give away" to an interloper something personal about the owner of the device.

In addition, different passcode and badging techniques can be used by a person depending on their situation. For example, as noted above, drawing can be eschewed on devices that don't have touch screens, and can be replaced by selecting a badge from a field of badges or by entering an alphanumeric passcode, such as onto a keyboard of a device. Alternate techniques for verifying oneself may also be made available at the same time, e.g., with a password box at the bottom of a display, and with a tracing grid in the main body of the display. The user may then choose whether they have enough hands free to complete either data entry operation.

The techniques also permit a user to personalize their access mechanisms in a graphical manner, but without a need to be a true artist or to find content to upload. In particular, a user can quickly select a pattern that will snap to the graphical elements in the grid over which they are tracing, and that pattern can be saved easily and efficiently.

Figure 2A:
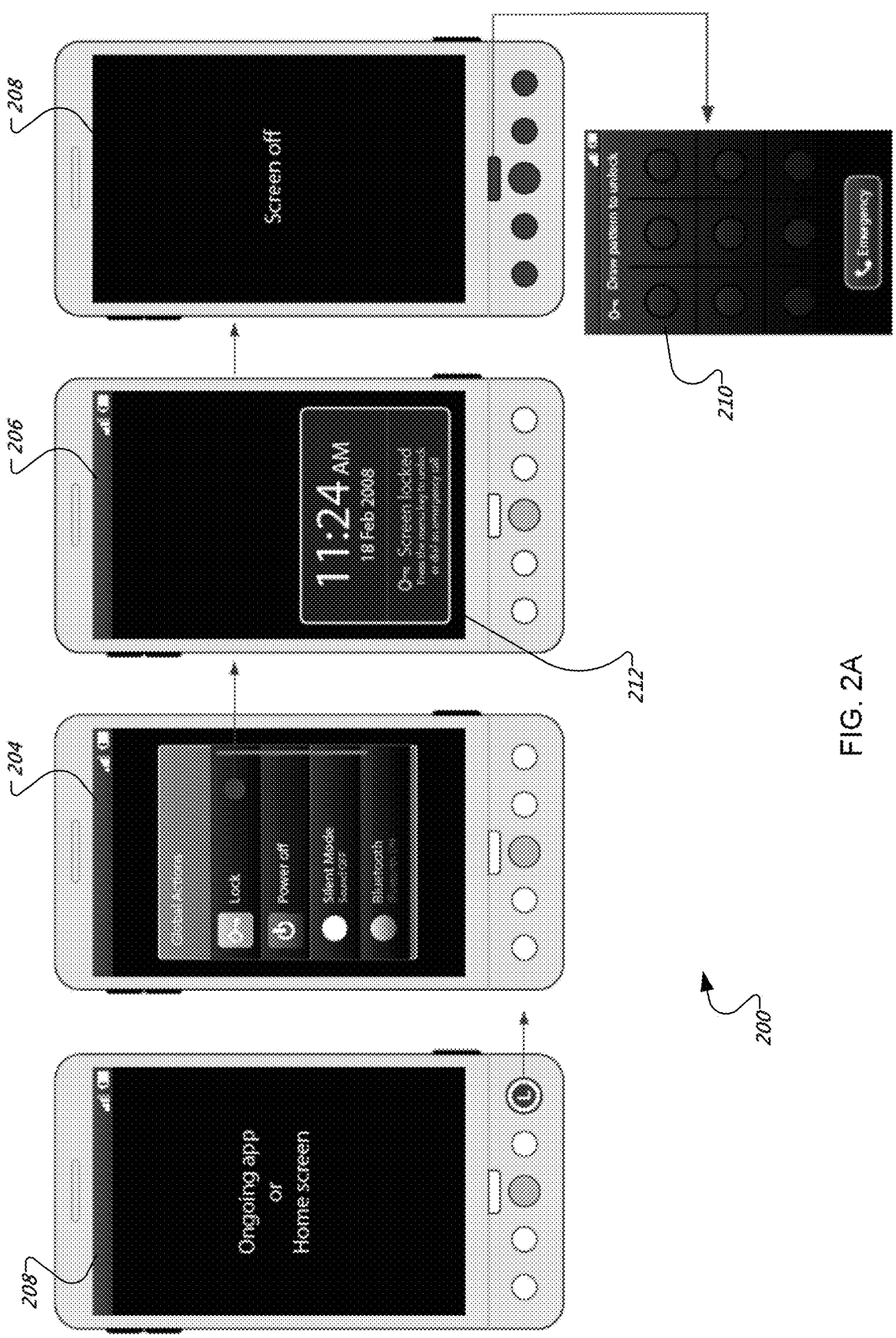
FIGS. 2A-2G shows various displays relating to unlocking a mobile device.

FIGS. 2A-2G shows various displays relating to unlocking a mobile device. FIG. 2A generally shows actions relating to a user selection to lock a device, or manually place it into a locked sleep mode. Display 202 shows schematically an ongoing application on a device or a home screen, which may include a wallpaper for background and one or more selectable controls in the form of icons that a user can select to launch applications on the device. A user is shown in the figure as providing a long press on the right-most hardware button (e.g., pressing the button and holding it for a period such as more than 1000 ms), which produces display 204 on the device. Display 204 shows a "global actions" menu listing by which the user may choose to change certain feature that are relevant across all applications on the device. One such option is putting the device into a locked mode so that it cannot be used without providing a pass code.

Display 204 shows the effect of selecting the "lock" feature, where the device at first shows very basic information such as the time and date, along with a message that the device is locked and an indication of what the user needs to do to unlock the device. After several seconds in this mode, the device turns off its screen, as show by display 208. When a user later selects a particular control—here the menu button in the center of the device—an unlock display 210 may be shown to the user. The unlock display is similar to display 104 in FIG. 1A, in that in shows a number of discrete graphical elements in a grid, in the form of circles or dots that are physically separated form each other. The user can readily understand that they are to trace a particular dot-to-dot pattern over the dots because of an instruction on the display 210. Also, the user can readily see that emergency access is available with the device even if they cannot unlock it (e.g., they are not the owner or are nervous and have forgotten the pattern).

Figure 2B:
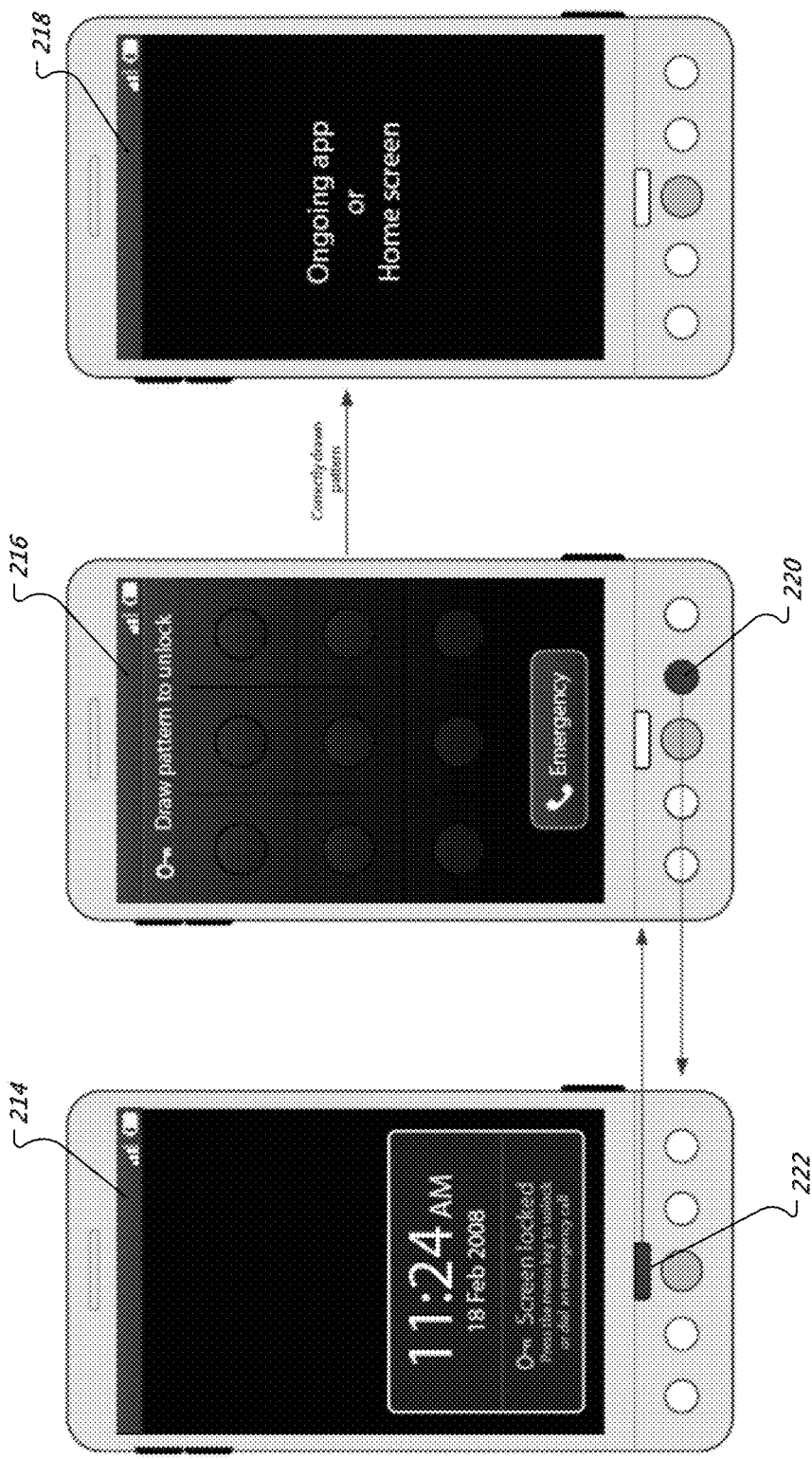

FIG. 2B shows an example of user inputs that may result in unlocking of a mobile device. A user is first faced with a locked device in display 214, which may have been generated when the user selected a control on the device, moved the device (e.g., by picking the device up) as sensed by an accelerometer, or in various other manners. In such a mode, the display 214 simply shows time and date, and some instructions regarding unlocking and emergency use of the device. Upon a user selection, such as selection of key 222, display 216 is shown, which is an unlocking input display like those shown above. Selection of key 220 may then return the user to display 214. Proper tracing of a pattern that matches a unique pattern for the user may then unlock the device, so that display 218 of an ongoing application or home screen for the device is displayed.

Figure 2C:
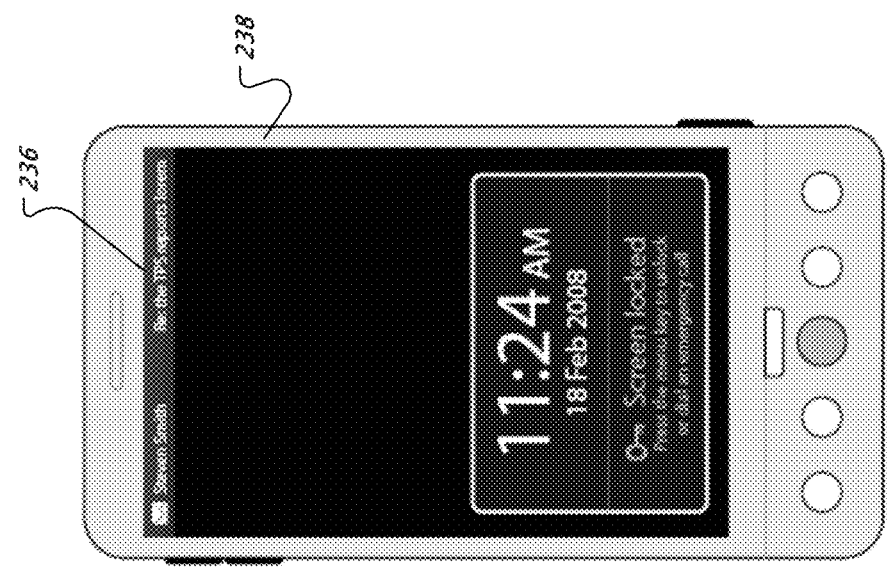
Figure 2C:
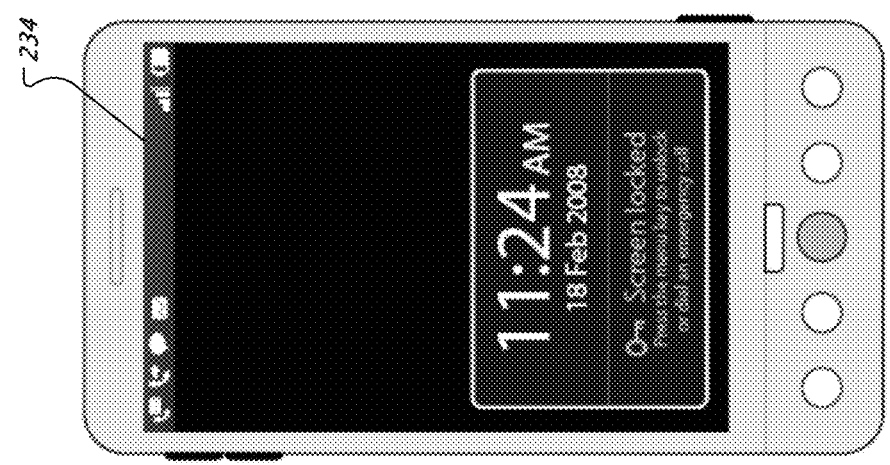
Figure 2C:

FIG. 2C shows examples of the interaction of notifications on a locked device. Display 230 shows a device with the screen turned off, such as if the device has not been used for an extended period. A light 232 in this example blinks or pulses to indicate that messages, such as incoming e-mail messages or voice mail messages, or other events, have occurred on the device since the screen was last on. The device may also provide notification such as by beeping or vibrating each time a new notification occurs, in a manner that will be familiar to a skilled artisan.

Display 234 shows the device when it has been awakened but is locked. In this situation, the basic time/date and instruction information from prior figures is shown to the user. In addition, the display 234 also shows a status bar along its top edge. Typically, such a status bar shows static indicators such as battery life, signal strength, and the presence or absence of features such as WiFi or Bluetooth (here, battery strength and signal strength indicators are shown).

In this example, additionally, the status bar also shows graphical elements for notifications. In particular, four icons are shown on the left side of the status bar, representing, from left-to-right, one ore more received voice mails since the screen was last operating, one or more missed calls, one or more text messages (e.g., from GOOGLE TALK), and one or more received e-mail messages. These icons help the user see whether, and to what extent, they have received information since last looking at their device, so that they can quickly determine whether they need to take the time to unlock the device.

Display 236 shows additional activity in the status bar 238 that occurs upon the receipt of a notification. In particular, the notification here is of an incoming e-mail, and sender and subject information from the e-mail temporarily replaces the normal information displayed in the status bar, and is scrolled from right to left across the status bar so that the user can readily see such information. In this manner, even where the user has not used the device for a long time, they can still quickly glance at it to see if the newest-arriving message is of interest to them. Such an arriving message may also be accompanied by an audible sound from the device so as to alert the user to the coming message information.

The display of information about incoming messages may also be prevented in one or more ways for purposes of security. For example, a device may take an open locked state and a closed locked state. The open locked state may be taken after several minutes of inactivity, while the closed locked state may be taken after a much longer period of inactivity. Both delay periods may be set by the user. In the open locked state, information about incoming messages may be displayed in the status bar 238, under the assumption that the rightful user still likely possesses the device so that eavesdropping on the messages is unlikely, and in any event, at least the device is locked to user input until a pass code is provided. In the closed locked state, there is a much more likely chance that the device has been stolen, so no message information is shown. In this manner, a thief might be able to see information from several incoming messages, but that ability will shut off after, for example, 30 minutes or an hour. As a result, stepped levels of security may be provided so as to minimize the interference with a user's use of a mobile device.

Figure 2D:
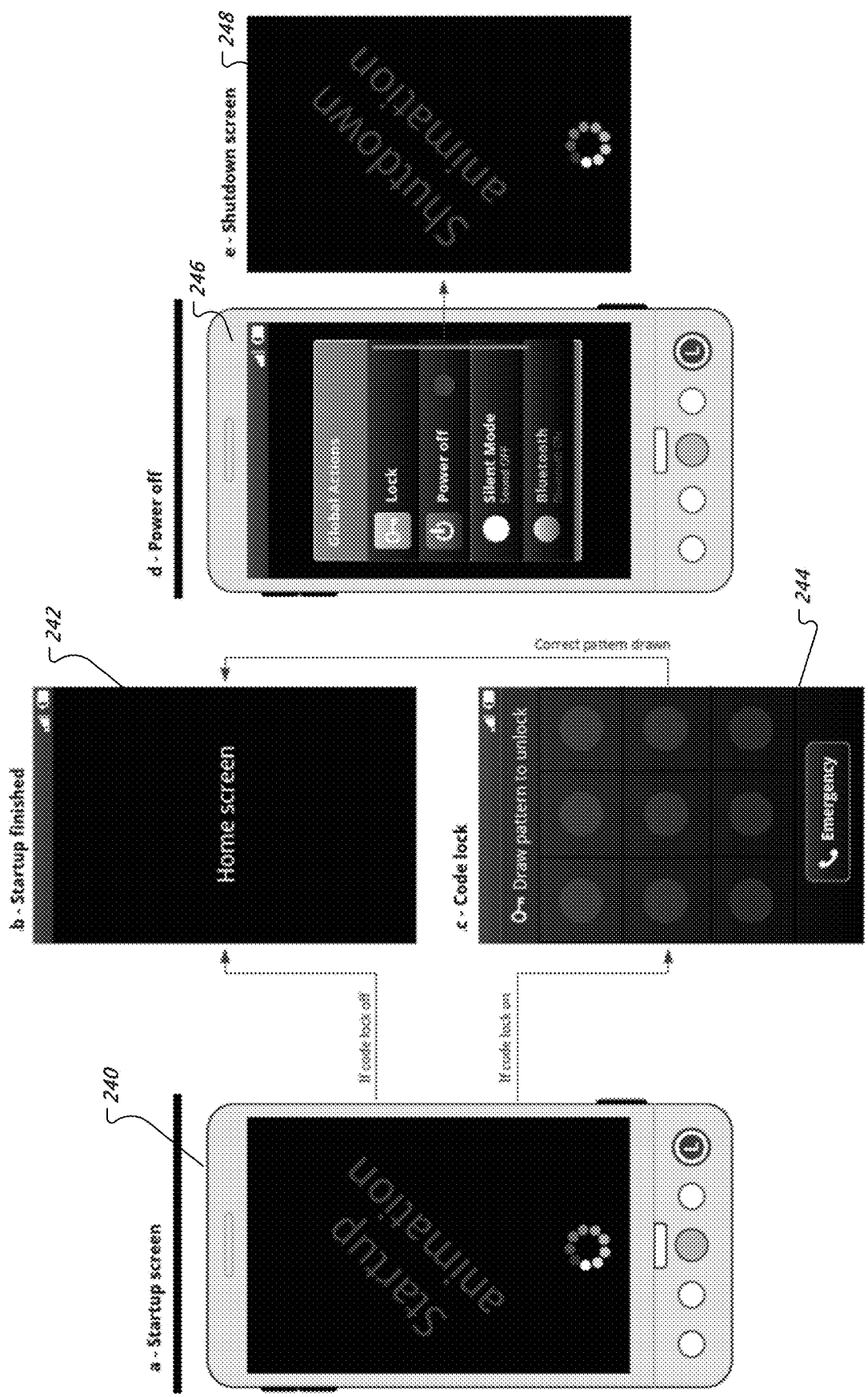

FIG. 2D shows examples of displays that can be shown when a mobile device is first started. Display 240 shows the presence of a start-up animation, which may take a variety of forms, as is well-known. For example, a generic wallpaper may be shown as the device powers up, or a user may submit a customer wallpaper or animation. If code lock is off for the device, display 242 is shown, which is a home screen for the device, shown here schematically. The home screen may be much like a on-screen desktop for a desktop computer, and may include icons for launching various applications along with various gadgets, such as gadgets that display the time, a local map, the local weather, and the like. If code lock is on for the device, display 244 may be presented, and the user may be required to enter a traced code across the grid of dots in order to get into the device further. If the user enters the appropriate code, the device will then switch to display 242.

Display 246 shows options presented to a user when they indicate an intent to power their device off. Such intent may be shown, for example, by a selection of an appropriate item from an on-screen menu, or by long pressing one of the hardware keys on the device. In the pictured example, the right-most hardware key is shown schematically as receiving a long press input. Such a selection by the user raises a global actions menu, that allows the user to lock the device, power the device down, turn the sound for the device on or off, and turn BLUETOOTH functionality on or off, among other things. If the user selects to power the device off, a shut down animation is shown, as represented schematically on display 248.

Figure 2E:
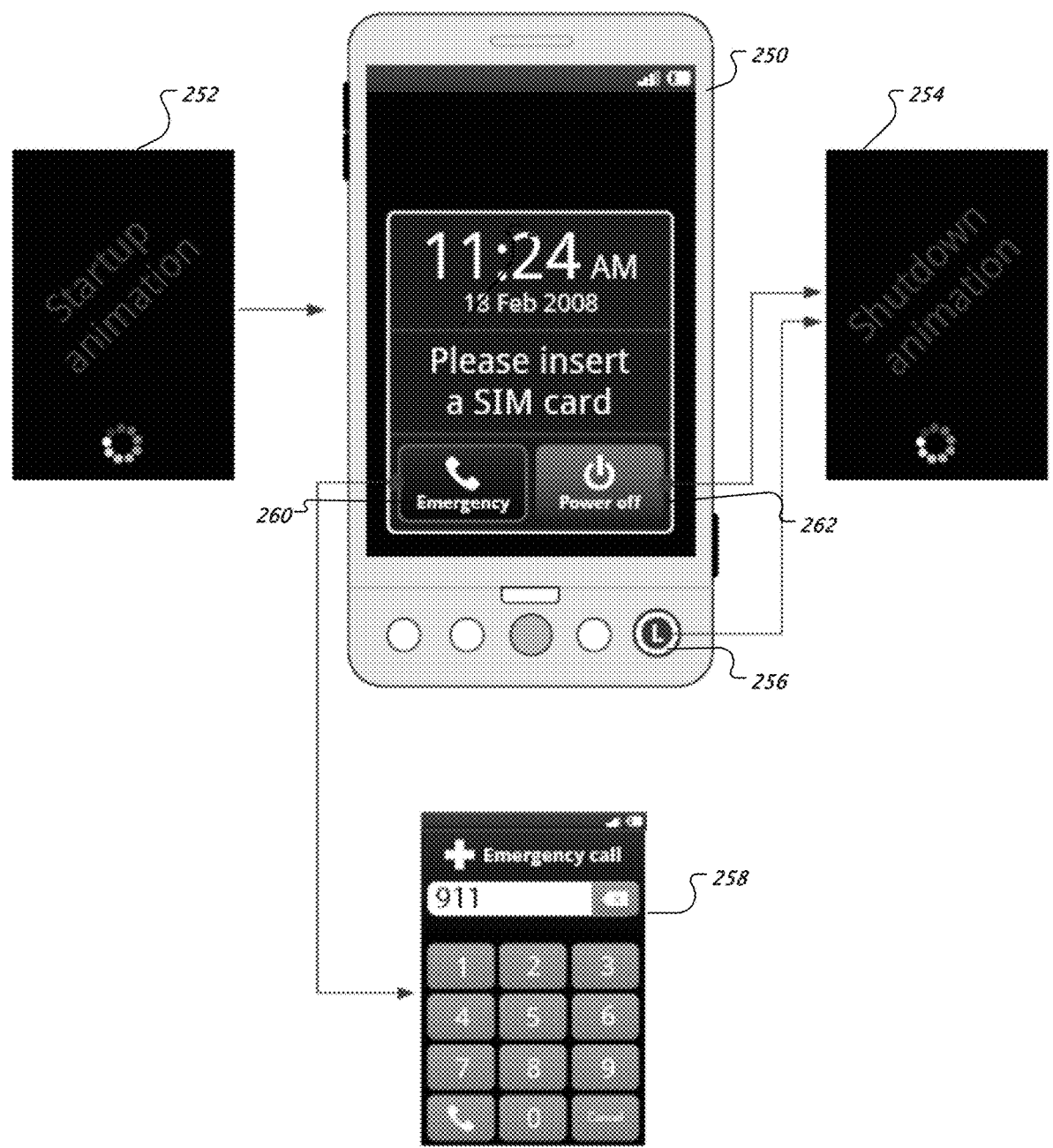

FIG. 2E shows access displays for a mobile device that does not contain a SIM card. When such a device is powered up, a startup animation may be shown on display 252, and then display 250 may be generated to provide the user with limited information such as the time and date. The display 250 may also alert the user that a SIM card is not in the device, and instruct them to insert one. In additional, an emergency control 260 is displayed, which, if selected by the user causes the device to show display 258. Such display provides for the easy dialing of emergency calls. Alternatively, display 258 could simply provide a single control that, when selected, would call 911 from the device (perhaps along with a control allowing the user to cancel a connection to 911).

The display 250 may also show a control for powering the device off which may be used, alternatively to a long press on a hardware key such as is indicated on the right-most hardware key of the device, to turn off the device and thereby play a shutdown animation as shown in display 254.

Figure 2F:
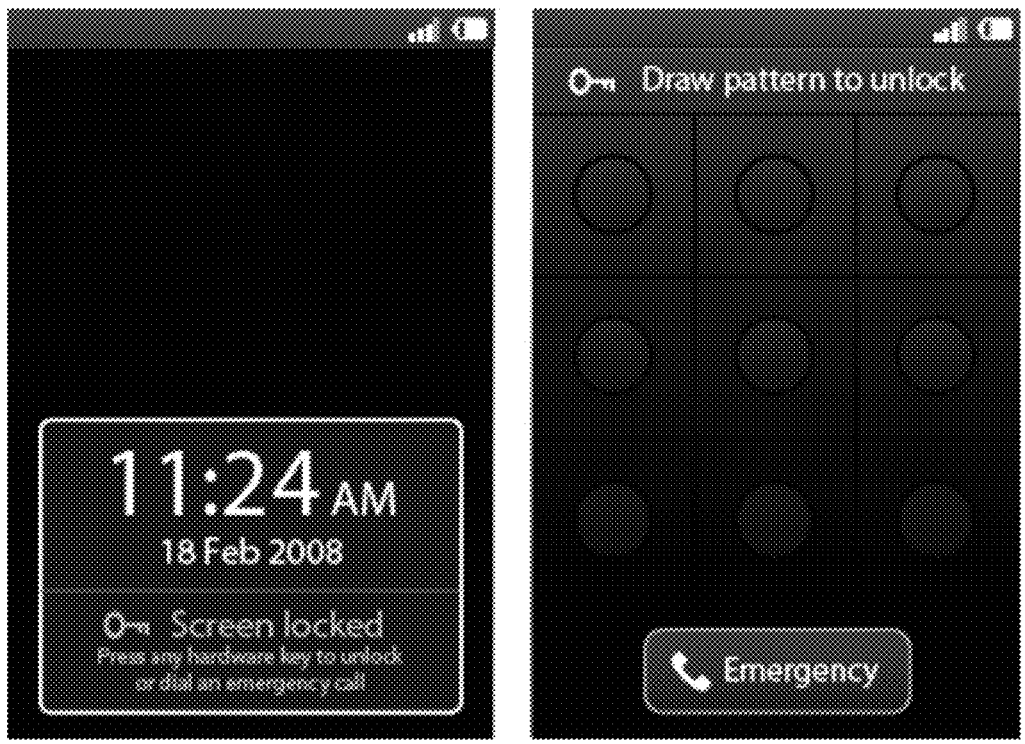
Figure 2G:
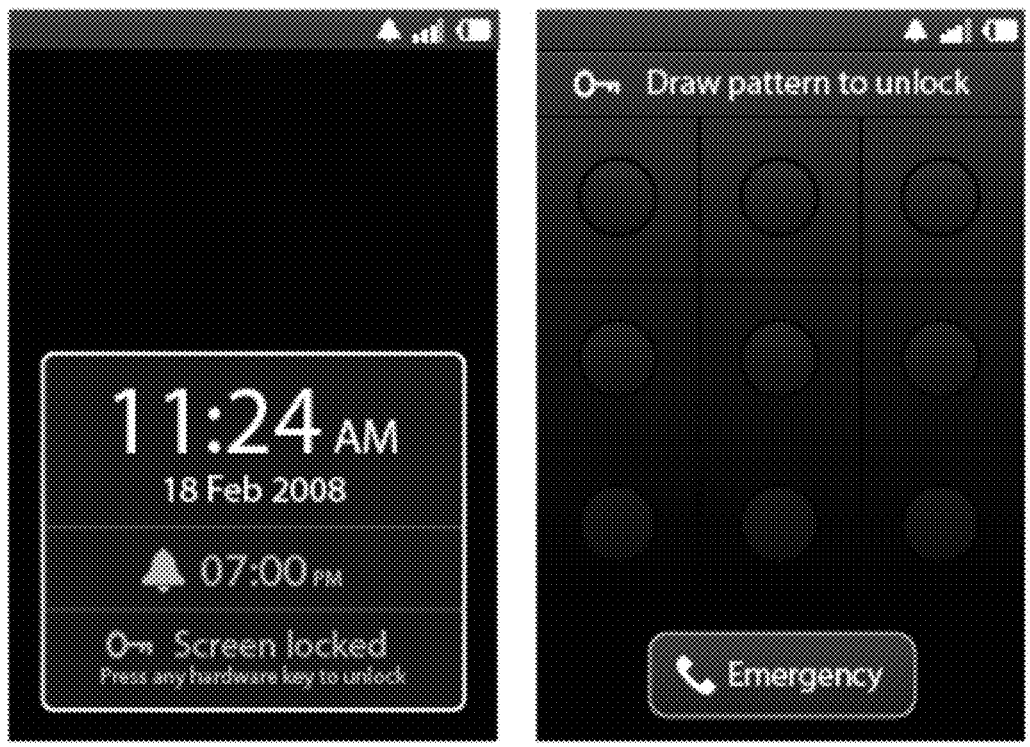

FIGS. 2F and 2G show additional example displays of a locked mobile device. FIG. 2F shows a generic display when a device is locked, along with a display that is shown when a user makes a selection indicating an intent to unlock the device (e.g., touching the screen, shaking the device in a certain manner, or pressing a hardware key). The second display permits a traced input in manners like those described above. FIG. 2G shows a similar pair of displays, but additionally shows an alert for a 7:00 pm appointment. The alert may be simply for an alarm with a clock, or may also be associated with an appointment in an electronic appointment book on the device. The information provided by the alert may be limited, so that the legitimate user of the device can see that they have something coming up (and should unlock the device if they want more detail), while an interloper would receive little useful or private information.

Figure 3:
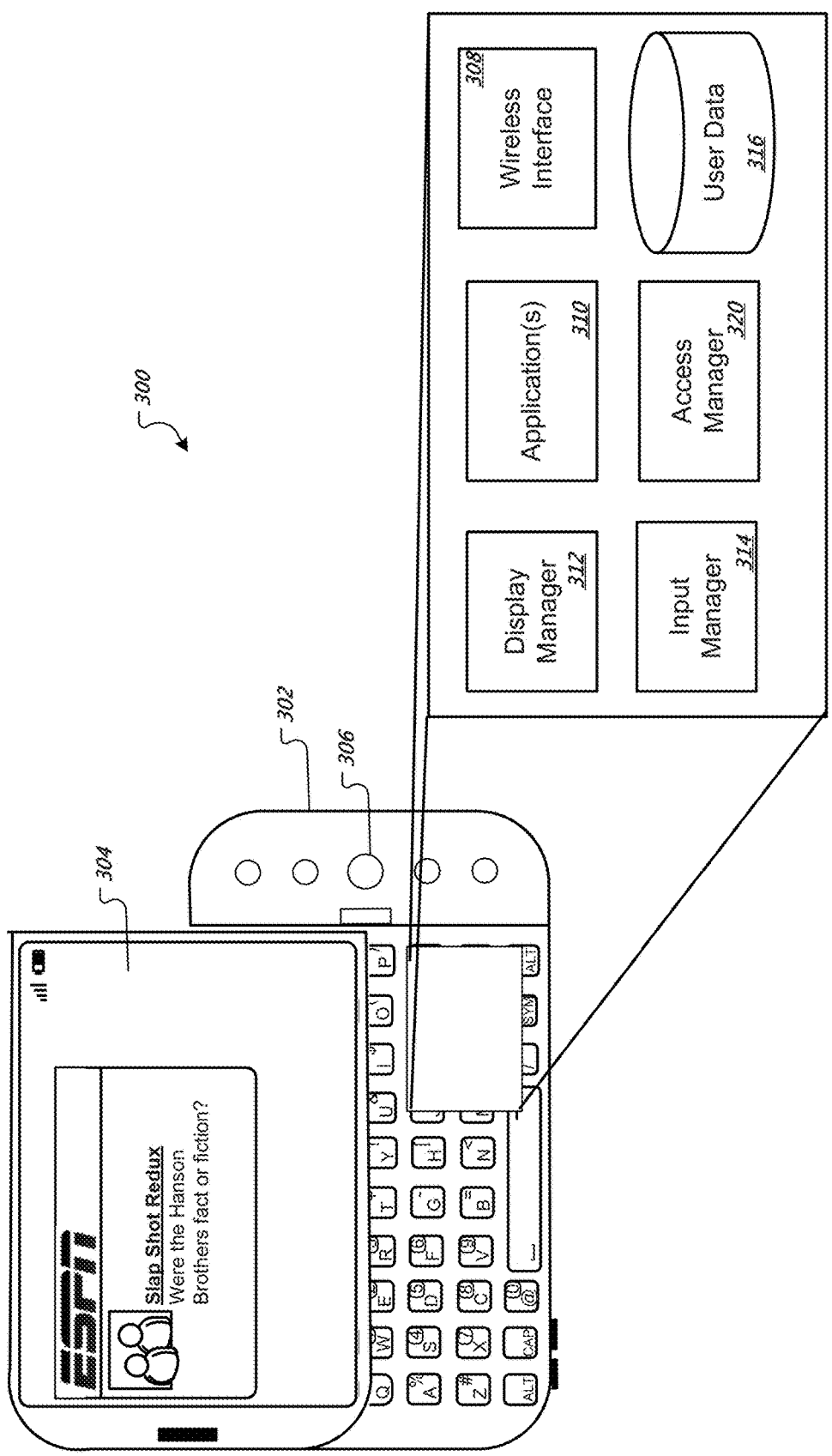
FIG. 3 is a schematic diagram of a mobile device exhibiting traced unlocking functionality.

FIG. 3 is a schematic diagram of a mobile device exhibiting traced unlocking functionality. The system 300 may be implemented using a mobile device such as device 302. The device 302 includes various input and output mechanisms such as a touch screen display 304 and a roller ball 306. A number of components within device 302 may be configured to present various applications to a user, and to control access to those applications for security purposes.

One such component is a display manager 312, which may be responsible for rendering content for presentation on display 304. The display manager 312 may receive graphic-related content from a number of sources and may determine how the content is to be provided to a user. For example, a number of different windows for various applications 310 on the device 302 may need to be displayed, and the display manager 312 may determine which to display, which to hide, and what to display or hide when there is overlap between various graphical objects. Also, as shown in FIG. 2C, certain information such as full application information in a main part of the display 304 may be blocked from a user's view, while information in a peripheral part of the display, such as providing message information and messaging icons in a status bar, may be displayed.

An input manager 314 may be responsible for translating commands provided by a user of device 302. For example, such commands may come from a keyboard, from touch screen display 304, from trackball 306, or from other such sources, including dedicated buttons or soft buttons (e.g., buttons whose functions may change over time, and whose functions may be displayed on areas of display 304 that are adjacent to the particular buttons). The input manager 314 may determine, for example, in what area of the display commands are being received, and thus in what application being shown on the display the commands are intended for. In addition, it may interpret input motions on the touch screen 304 into a common format and pass those interpreted motions (e.g., short press, long press, multiple press, straight-line drags, and multi-touch inputs) to the appropriate application. The input manager 314 may also report such inputs to an event manager (not shown) that in turn reports them to the appropriate modules or applications.

A variety of applications 310 may operate, generally on a common microprocessor, on the device 302. The applications 310 may take a variety of forms, such as mapping applications, e-mail and other messaging applications, web browser applications, and various applications running within a web browser or running extensions of a web browser.

An access manager 320 may control access to device 302. In particular access manager 320 may turn off or may limit the ability to provide inputs to the device 302 such as on touch screen display 304. In one example, the access manager may, when a period of inactivity on the device has passed, notify the event manager to provide indications of input events only to the access manager. The access manager may then determine whether the input is in an area for tracing a pattern or an area for accessing emergency numbers. If it is in neither, the access manager may retain the device 302 in a locked state. If the input is in an emergency area, the access manager may pass control to an emergency number dialing application that may permit limited user interaction to dial 911 or a similar number. If the input is in a tracing area, then the access manager 320 may register the areas in a grid that the tracing occurs, may provide visual feedback to a user doing the tracing, and may compare an entered tracing to a stored pass code when the user completes the tracing.

A wireless interface 308 managers communication with a wireless network, which may be a data network that also carries voice communications. The wireless interface may operate in a familiar manner, and may provide for communication by the device 302 with messaging service such as text messaging, e-mail, and telephone voice mail messaging.

In addition, the wireless interface 308 may support downloads and uploads of content and computer code over a wireless network.

Various forms of persistent storage may be provided, such as using fixed disk drives and/or solid state memory devices. In particular, a user data database 316 may stored particular information about a user of the device 302. In the example relevant here, the user data may include preferences entered by the user regarding whether the device is to be lockable automatically, the period of inactivity required to lock the device, and the unlocking pattern for the user.

Using the pictured components, and others that are omitted here for clarity, the device 302 may provide particular actions in response to user inputs. Specifically, the device 302 may go into a locked mode after a period of inactivity and may go into a deeper locked mode after an even greater period of inactivity, or in response to a specific selection by a user to lock the device 302 (e.g., by long pressing one of the device 302 hardware keys). The device may then respond, in manners like those described above, to user inputs to unlock the device (or failures to unlock the device) or to access certain limited services on the device such as notices of incoming messages or interaction to access emergency services.

Figure 4A:
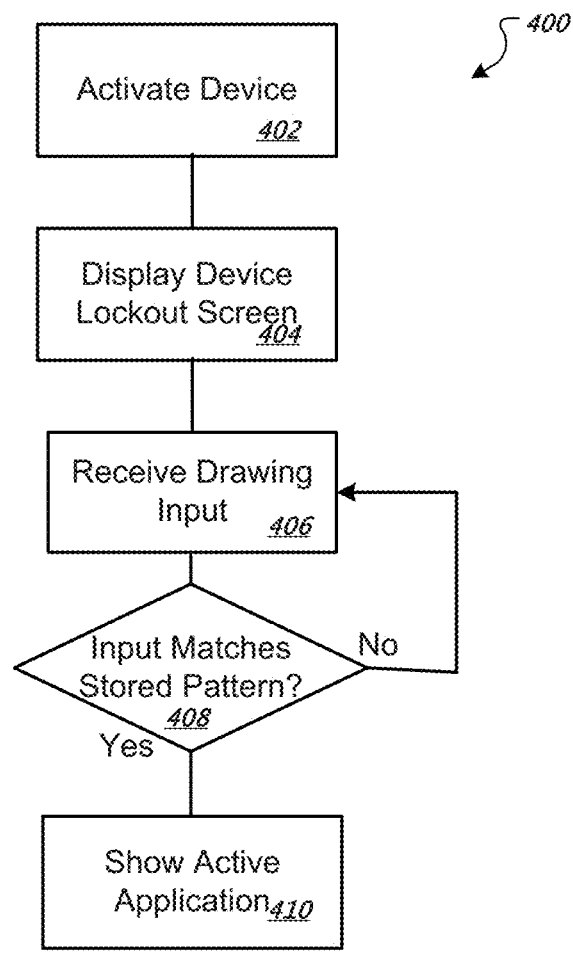
FIGS. 4A-4B are flow charts of example processes for receiving graphical user selections for unlocking a mobile computing device.
Figure 4B:
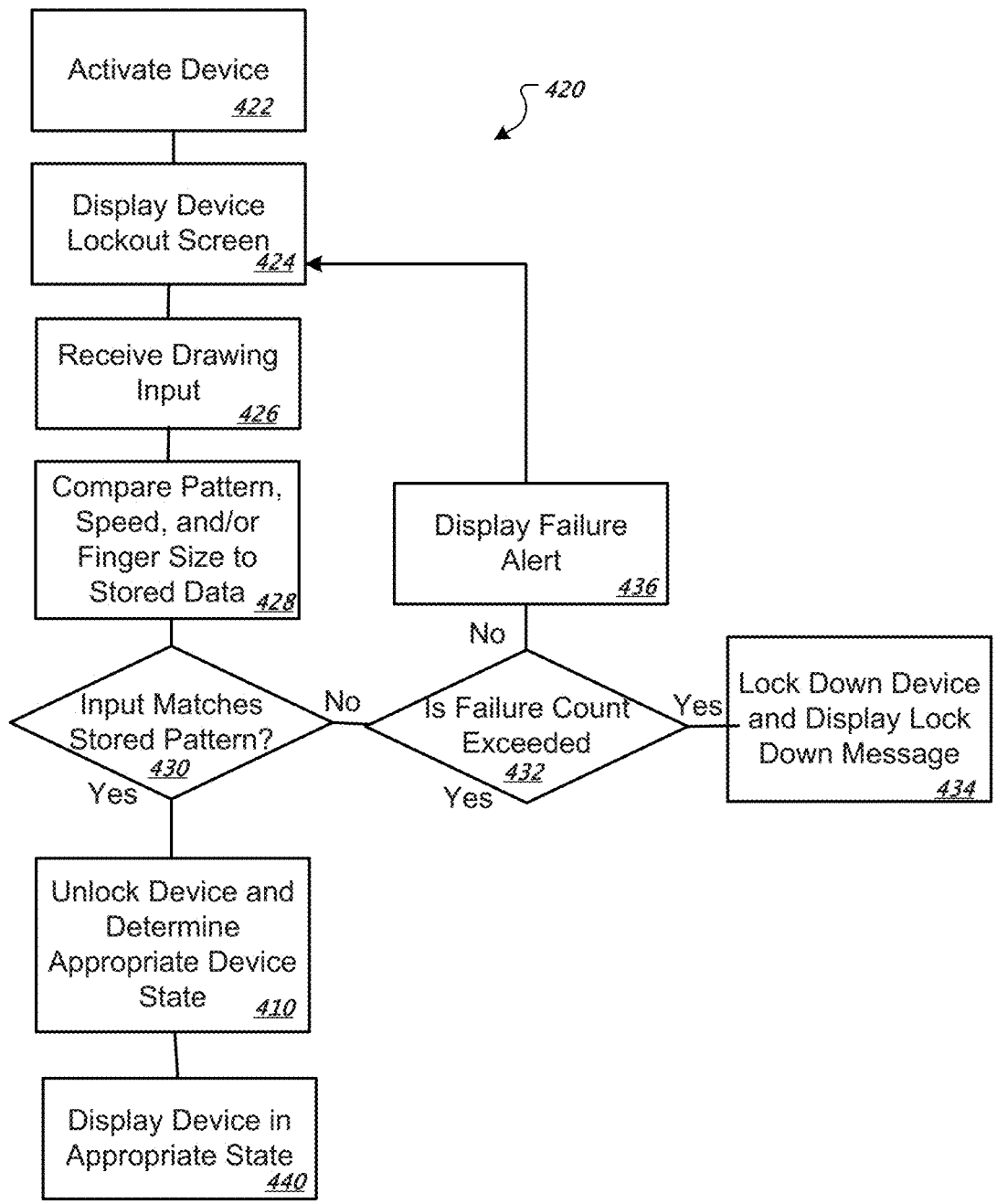

FIGS. 4A-4B are flow charts of example processes for receiving graphical user selections for unlocking a mobile computing device. Referring to FIG. 4A, the process 400 begins at box 402, where a mobile device is initially activated. Where the device lock out is on, the device may initially display a lock out screen, which may take the forms discussed above, such as by including a grid of distinct elements through which a user may trace a pattern, along with instructions to the user. The screen may also be blank so that the user must know that they are to trace a pattern, and also know where to trace it—to provide additional security. The device receives a drawing input at box 406, in the form of a user dragging their finger across the screen of the device.

The input from the user may take other forms. For example, where the device contains an accelerometer, the input may take the form of sweeping the device through the air in a pattern or tapping a pattern on the phone with a user's fingers. Under the first scenario, for example, the user may trace out a word in space with the device, and the changes in acceleration sensed by the accelerometer may be compared to a recorded motion of the device. So that perfect matches are not required, the acceleration data may be generalized to a sufficient degree that a user who knows the general motion that is required may repeat the motion most of the time, whereas someone who does not know the motion cannot easily get into the device. For the second scenario, a user may tap the device using the beats from a favorite song while they imagine the song in their head. The timing of the taps may be compared to a previously generated signature that was produced from the user providing the sequence earlier. The tempo of the tapping may be normalized out of the tapping timing so that only the relative speed of taps (e.g., quarter notes, eighth notes, and sixteenth notes, etc.) is considered.

If the input matches the stored profile or values by whatever form it is entered, as determined at box 408, then the device shows the user the active application (box 410). For example, the application or applications that were active when the device went into a locked state may be displayed in the same form they took when the device was locked. Likewise, a welcome screen or desktop may also be displayed. If the input is not a match, then the lockout screen is displayed in its original form again, perhaps with a message stating that the prior attempt to unlock the device was a failure.

FIG. 4B shows a flow chart of another process 420 for controlling user access to a locked mobile device. At box 422, the device is activated, such as by initially turning it on or by a user indicating an intent to take the device out of a locked status. As in the other situations shown and described above, the lockout screen for the device may be displayed so that the user may enter a traced or motion-based pass code (box 426) in manners like those described above, such as by tracing a pattern with their finger or a stylus on a dot-to-dot style of representation on a device display.

Upon receiving an indication that the user has finished entering a pass code, such as by the lifting of a user finger off a touch screen or by tracking the elements passed by the finger in real time until all elements in the code have been contacted in the right order, the device may compare the pattern drawn, the speed of the drawing, and/or the size of the user's finger with stored values that were selected earlier by the legitimate user or entered earlier by the legitimate user (box 428). If the measured parameters match the stored parameters sufficiently (i.e., an exact match may not be required for a parameter such as speed, lest the user not be able to unlock their own device), then the device is opened and an appropriate device state is determined (box 438). For example, the device may check a status registry or similar structure to determine what applications were running when the device was locked, and the status of those applications. If the status registry is empty, such as when the device is first turned on, the device state may simply be a desktop or home screen for the device. With the appropriate state determined, that state may then be displayed on the device (box 440) and the user may interact with the device in a normal manner.

If the entered pass code is not a sufficient match, then the device may determine whether the user has failed to enter the pass code multiple times in a row, and is thus likely to be an interloper trying to hack into the device (box 432). If the count has been succeeded, then the device can be locked down with a lock down message being displayed (box 434), so that the device can only be unlocked by alternative mechanisms. For example, the device may have a separate pass code that is much more complex than the first or may be unlocked only be being contacted wirelessly over a network and then being subjected to a pre-determined unlocking protocol. In these ways, the true user may have techniques for unlocking the device that he or she would not carry with him or her (so that a thief could not rummage through the person's belongings for a hint) and/or a corporate IT department may have uber-pass codes that they can use when employees get into trouble.

Figure 5:
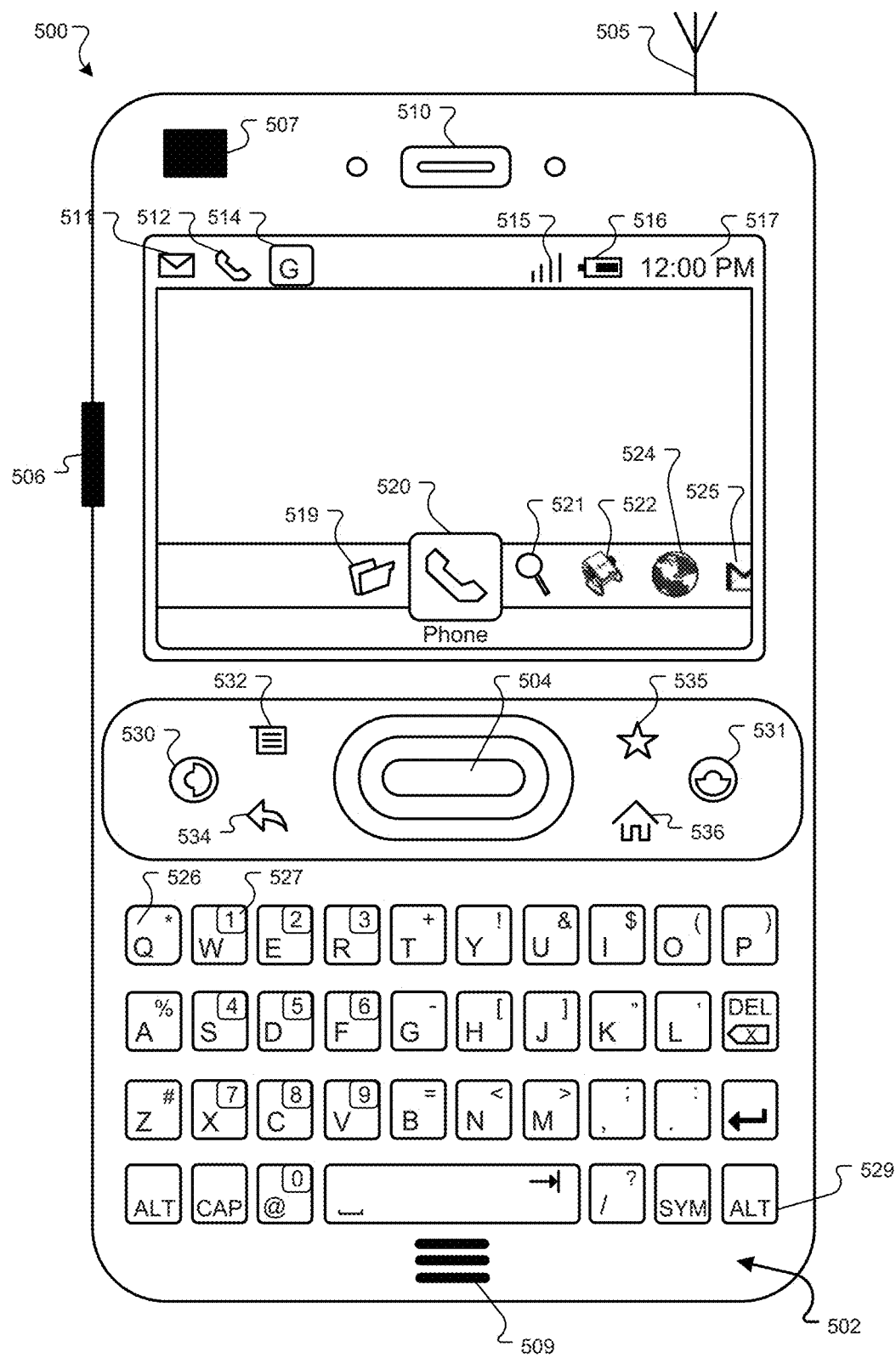
FIG. 5 is a schematic representation of an exemplary mobile device that implements embodiments of the notification techniques described herein.

Referring now to FIG. 5, the exterior appearance of an exemplary device 500 that implements the user interface features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), SGPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285 transceiver and PM7540power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
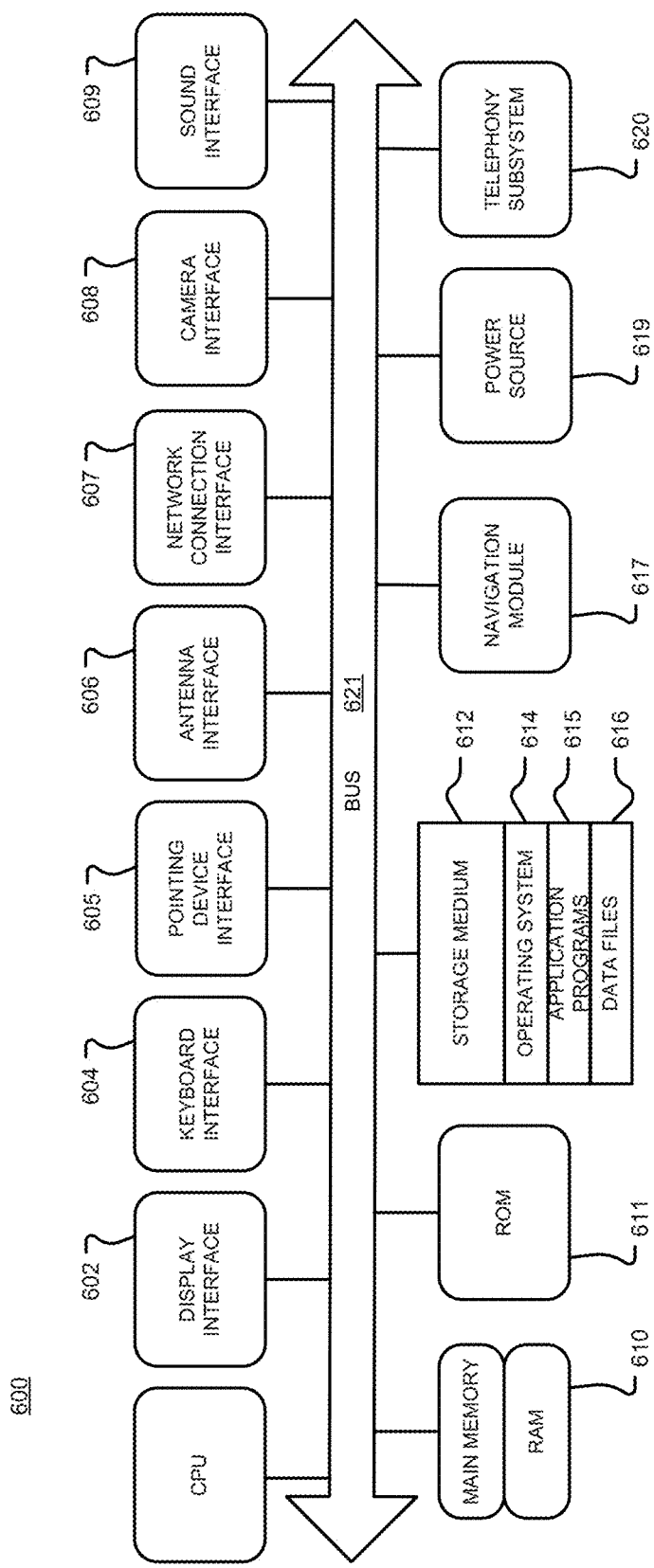
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
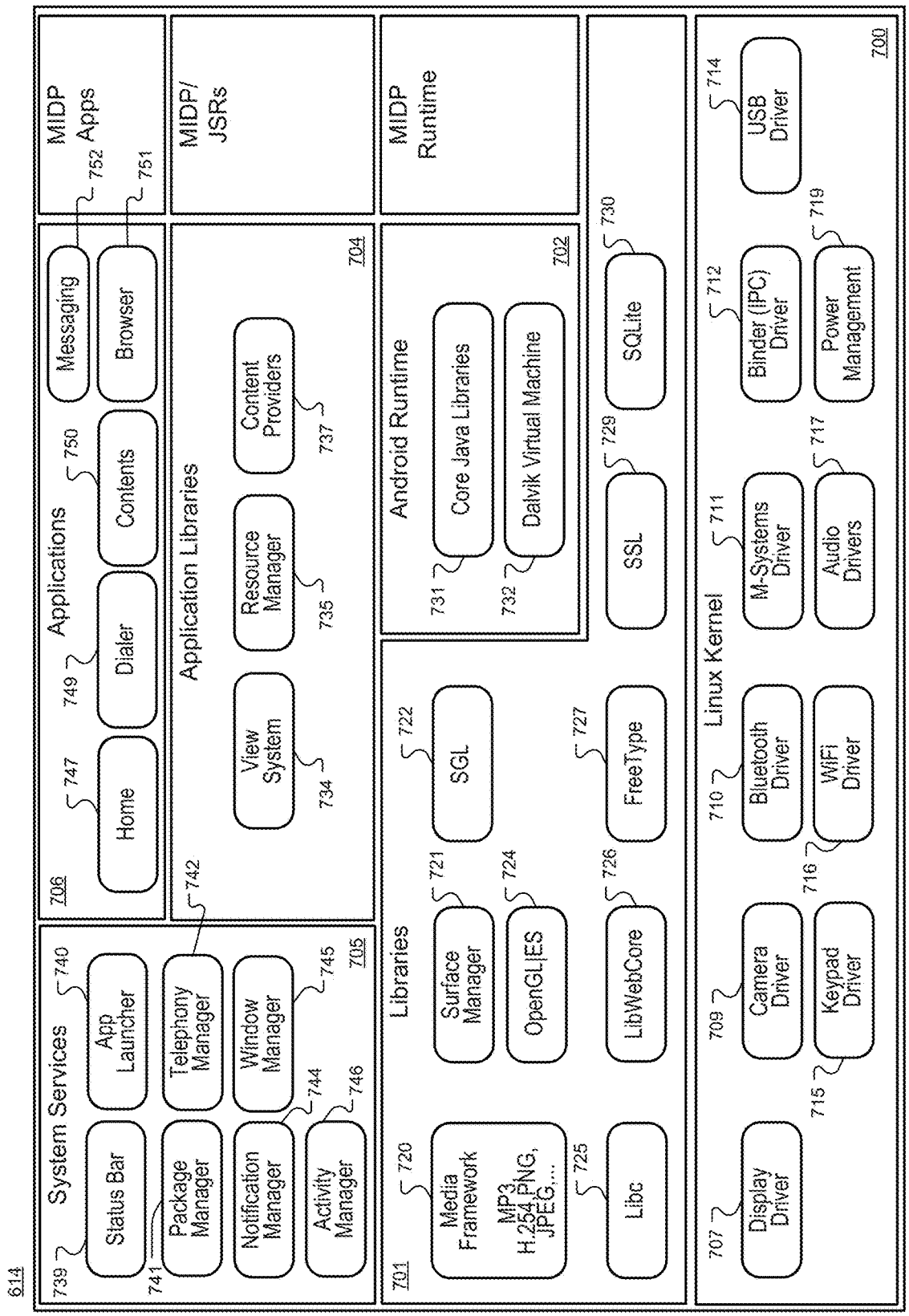
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the GOOGLE mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, and a browser application 751. Each of the applications may generate graphical elements that either do or do not have long press interactions. As described above, those that do not have long press interactions may provide no immediate visual feedback when they are first pressed, while those that do have such interactions may be highlighted between the time they are first pressed and the expiration of the long press period. Also, the highlighting may not occur exactly upon a press, so that mere tapping of an item does not cause it to be highlighted; instead, the highlighting may occur upon the expiration of a short press period that is slightly more than the time period for a tap, but appreciably shorter than a long press period.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
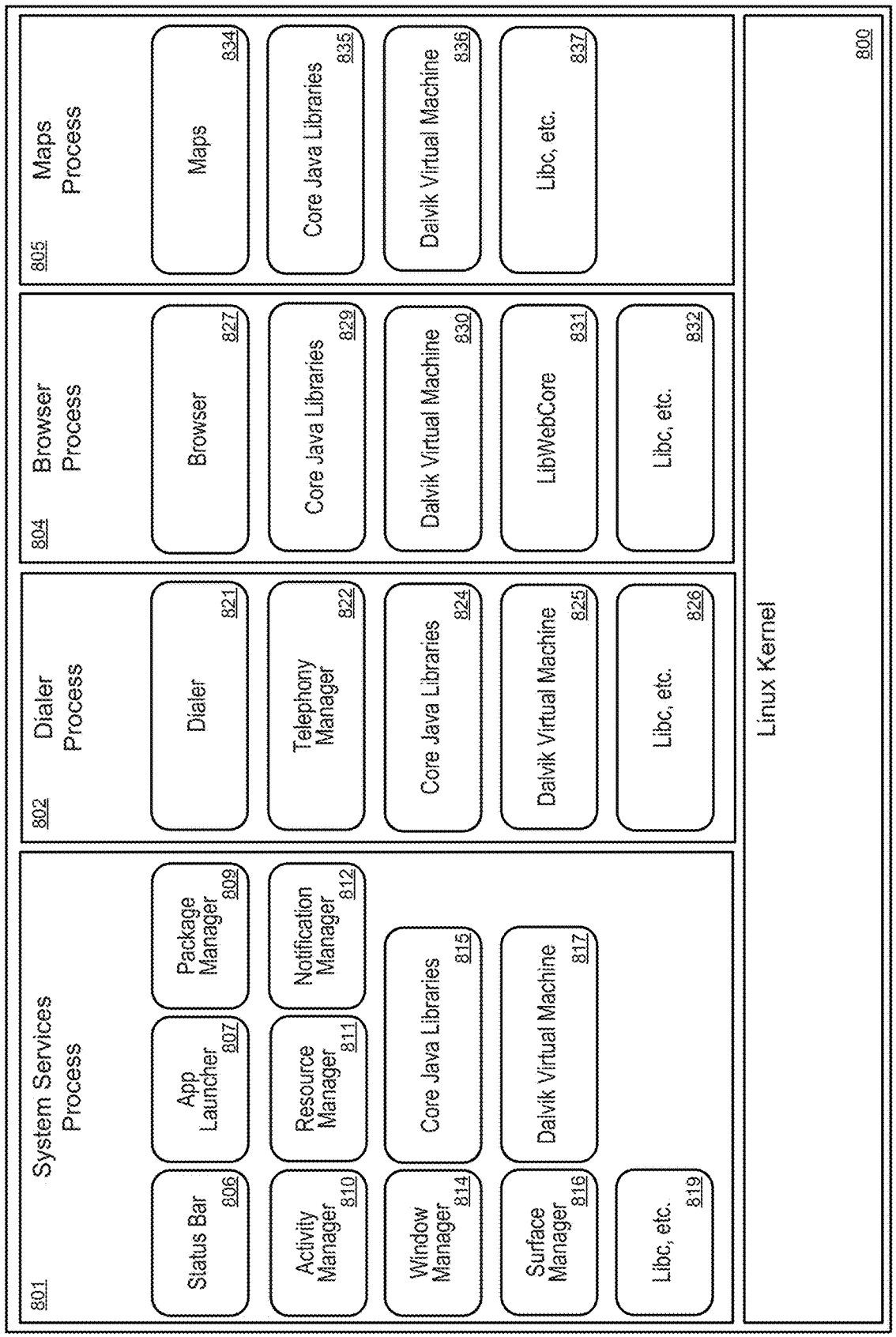
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
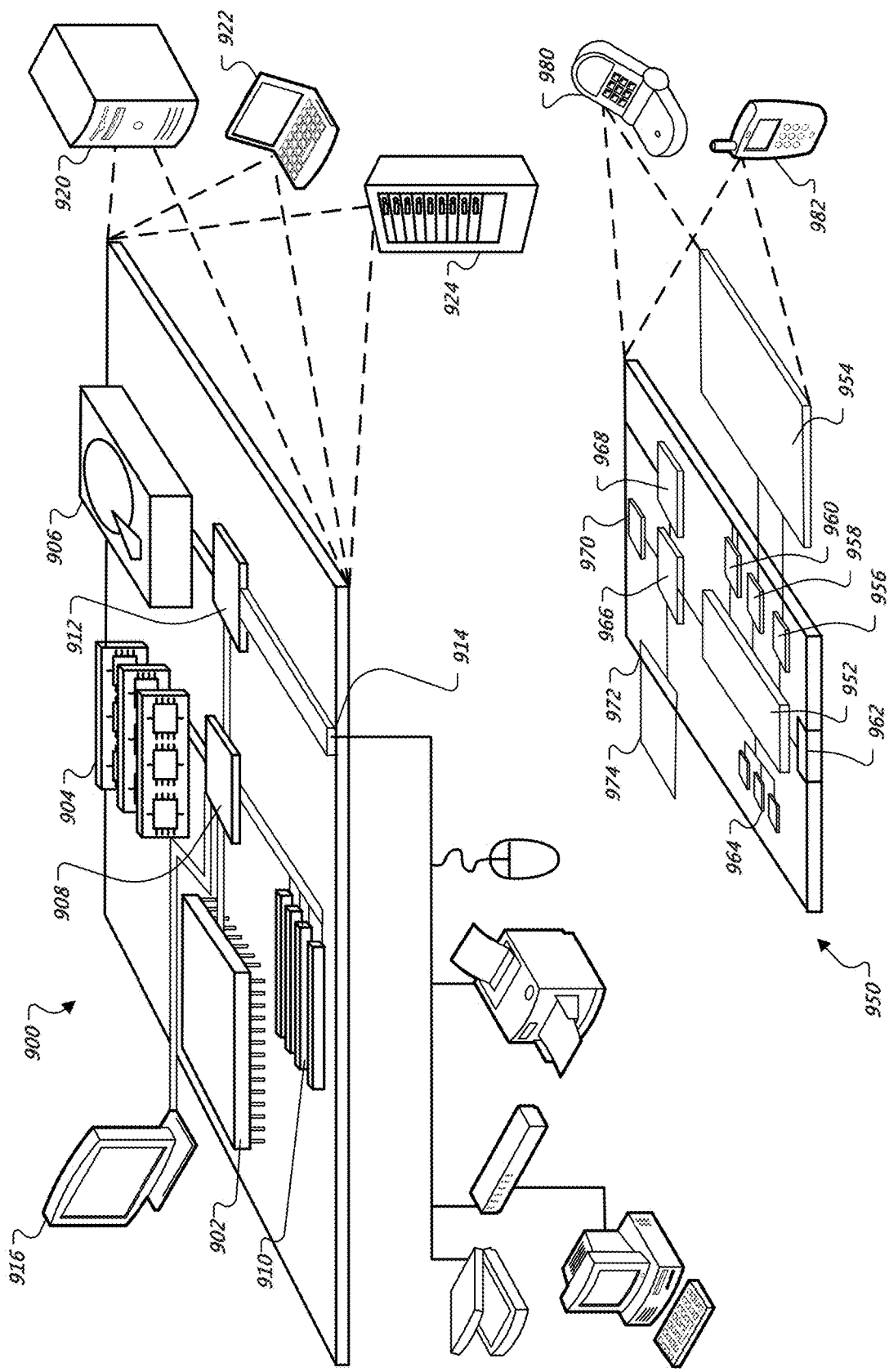
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method executed by one or more processors, the method comprising:
   entering, by a computing device, a locked mode in which access to one or more functions of the computing device is restricted;
   receiving, by the computing device and while in the locked mode, a wireless communication;
   receiving, by the computing device and while in the locked mode, a first user input; and
   displaying, (i) by the computing device, (ii) while remaining in the locked mode, and (iii) in response to the first user input, a lock mode display screen comprising a presentation of current time and a notification indicative of the received wireless communication.

2. The computer-implemented method of claim 1, wherein the lock mode display screen includes a presentation of instructions for unlocking the computing device.

3. The computer-implemented method of claim 2, further comprising:
   receiving, by the computing device and while the lock mode display screen is being displayed, a second user input;
   displaying, by the computing device and in response to receiving the second user input, an unlock entry screen that allows a user to enter an unlock input using touchscreen capabilities of the computing device;
   receiving, by the computing device, the unlock input via a touchscreen of the computing device; and
   entering, by the computing device and in response to receiving the unlock input, an unlocked mode.

4. The computer-implemented method of claim 1, wherein the received wireless communication is an indication of an incoming call and the notification comprises a notification of a missed call.

5. The computer-implemented method of claim 1, wherein the received wireless communication is an indication of a voice message and the notification comprises a notification of the voice message.

6. The computer-implemented method of claim 1, wherein the received wireless communication is a text message and the notification comprises a notification that the text message has been received since a last time the computing device was in an unlocked mode.

7. The computer-implemented method of claim 6, wherein the notification further comprises an indication of a sender of the text message and at least a portion of content of the text message.

8. The computer-implemented method of claim 1, wherein the lock mode display screen further comprises a presentation of a second notification indicative of a scheduled calendar event.

9. The computer-implemented method of claim 1, wherein the lock mode display screen further comprises a presentation of a second notification indicative of a preset alarm time.

10. The computer-implemented method of claim 1, further comprising:
    receiving, by the computing device and while the lock mode display screen is being presented, a second user input; and
    displaying, by the computing device and response to the second user input, additional detail relating to the notification while remaining in the locked mode.

11. The computer-implemented method of claim 1, wherein the lock mode display screen further comprises a presentation of instructions for placing an emergency call, the method further comprising:
    receiving, by the computing device and while the lock mode display screen is being displayed, a second user input; and
    displaying, by the computing device and response to the second user input, an emergency call screen, wherein the emergency call screen permits a user to dial a telephone number, and wherein the emergency call screen restricts user input from accessing a contact list stored on the computing device.

12. The computer-implemented method of claim 1, wherein the notification indicates a number of received messages.

13. A non-transitory computer readable medium storing instructions that, when executed by one or more processors, cause the one or more processors to perform operations comprising:
    entering, by a computing device, a locked mode in which access to one or more functions of the computing device is restricted;
    receiving, by the computing device and while in the locked mode, a wireless communication;
    receiving, by the computing device and while in the locked mode, a first user input; and
    displaying, (i) by the computing device, (ii) while remaining in the locked mode, and (iii) in response to the first user input, a lock mode display screen comprising a presentation of a current time and a notification indicative of the received wireless communication.

14. The medium of claim 13, wherein the lock mode display screen further comprises a presentation of instructions for placing an emergency call, the operations further comprising:
    receiving, by the computing device and while the lock mode display screen is being displayed, a second user input; and
    displaying, by the computing device and response to the second user input, an emergency call screen, wherein the emergency call screen permits a user to dial a telephone number, and wherein the emergency call screen restricts the user from accessing a contact list stored on the computing device.

* * * * *